United States Patent [19]

Gail

[11] Patent Number: 5,313,210
[45] Date of Patent: May 17, 1994

[54] POLARIMETRIC RADAR SIGNAL MAPPING PROCESS

[75] Inventor: Willaim B. Gail, Boulder, Colo.

[73] Assignee: Ball Corporation, Muncie, Ind.

[21] Appl. No.: 21,310

[22] Filed: Feb. 23, 1993

[51] Int. Cl.$^5$ ............................................. G01S 13/90
[52] U.S. Cl. ..................................... 342/25; 342/188; 342/174; 342/91; 342/191
[58] Field of Search ....................... 342/25, 91, 92, 93, 342/159, 174, 191, 194, 188

[56] References Cited

U.S. PATENT DOCUMENTS

| | | | |
|---|---|---|---|
| H1,181 | 5/1993 | Rihaczek | 342/25 |
| 5,105,195 | 4/1992 | Conrad | 342/174 |
| 5,170,171 | 12/1992 | Brown | 342/191 |
| 5,179,383 | 1/1993 | Raney et al. | 342/25 |

OTHER PUBLICATIONS

Curlander, et al., "*Synthetic Aperture Radar Systems and Signal Processing,*" pp. 348-369 Wiley Series in Remote Sensing, Kong, ed., John Wiley & Sons, Inc., New York.
Elachi, et al., Spaceborne Synthetic-Aperture Imaging Radars: Applications, Techniques, and Technology, pp. 1174-1209, 1982, Proceedings of the IEEE, vol. 70, No. 10.
Freeman, et al., "Calibration of Stokes and Scattering Matrix Format Polarimetric SAR Data," pp. 531-539 1992, IEEE Transactions on Geoscience and Remote Sensing, vol. 30, No. 3.
Freeman, "SAR Calibration: An Overview," pp. 1107-1121 1992, IEEE Transactions on Geoscience and Remote Sensing, vol. 30, No. 6.

Primary Examiner—John B. Sotomayor
Attorney, Agent, or Firm—Gilbert E. Alberding

[57] ABSTRACT

A process for mapping a region of interest using polarimetric radar signals is disclosed. The process provides for the polarimetric calibration of polarized signal data to account for distortions arising from cross-talk and channel imbalance during signal transmission and/or reception. Moreover, the process also can be used to correct for ionospheric signal distortions of polarized signals with low frequencies prone to Faraday rotations upon encountering the ionosphere. Such calibrations are accomplished with a reduced number of, typically ground-based, signal reflection devices used for calibrating the polarimetric signals to compensate for the above distortions.

23 Claims, 5 Drawing Sheets

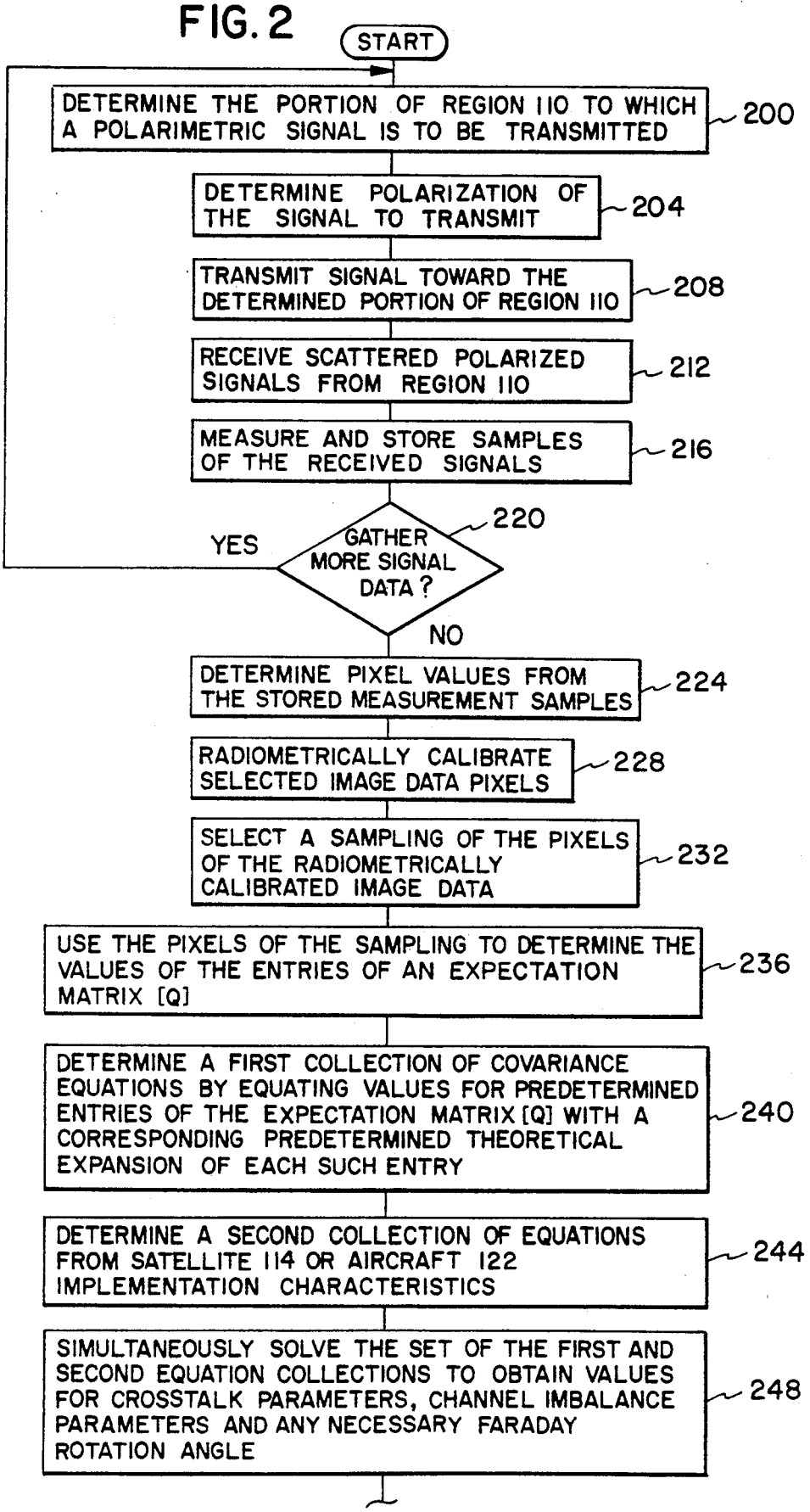

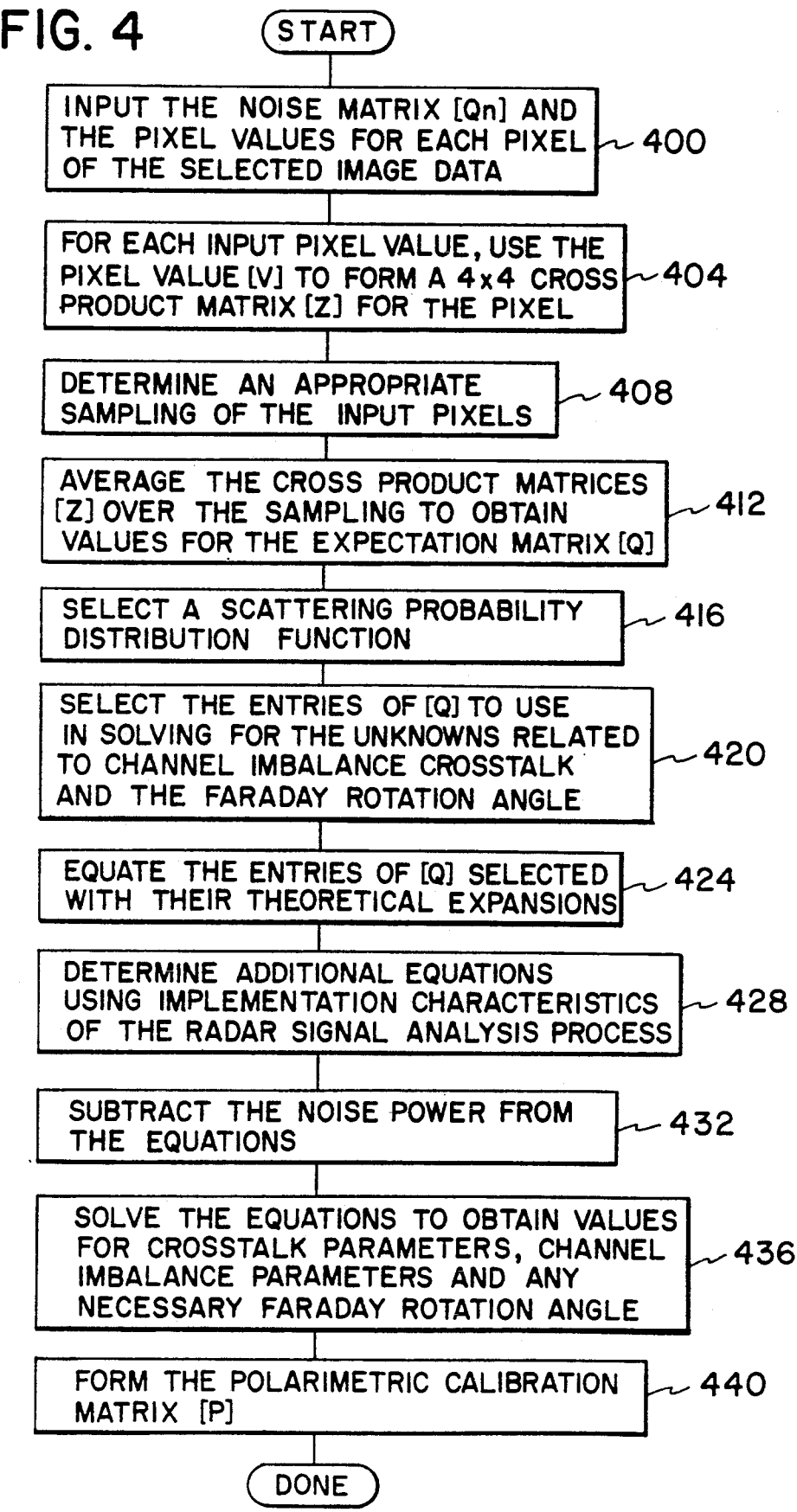

POLARIMETRIC RADAR SIGNAL MAPPING PROCESS

FIELD OF THE INVENTION

The present invention relates to polarimetric radar mapping processes for obtaining information regarding a region of interest and, more particularly, to an improved process which compensates for polarimetric signal distortions due to cross-talk, channel imbalance, and ionospheric Faraday rotations.

BACKGROUND OF THE INVENTION

Polarimetric radar mapping processes have been used, via aircraft and satellites, to determine features of a geographical region of interest with a high degree of resolution. In particular, such features as the biomass or the soil moisture content of the region can be determined from polarized radar signals transmitted toward and received from the region. Typically at least two signals having distinct predetermined signal polarizations are transmitted and received. The received signals which are deflected or scattered from the region are analyzed according to their polarization, amplitude and phase. To properly analyze a received signal, a polarimetric radar signal mapping process must calibrate signal derived data to account for various signal distortions. For example, there are imbalances between the circuits or channels transmitting distinct polarized signals. That is, there can be unintended amplitude and/or phase differentials between these channels resulting in two signals of distinct polarization being transmitted with unintended imbalances in their amplitudes and/or phases. Further, similar channel imbalances can occur upon reception of received signals scattered from the region of interest. Additional signal distortions can result from the leakage or cross-talk of signals having one polarization into circuitry for the transmission or reception of signals having a different polarization.

For the above-mentioned distortions, there are well known equations which provide functional relationships between: (a) measurements of the received scattered signals and (b) calibration coefficients or variables used to reduce the above distortions. Moreover, there have been various prior art mapping processes for determining the cross-talk and channel imbalance calibration coefficients for calibrating the received scattered signals. Such processes incorporate one or a combination of two basic approaches: (1) receiving signals from artificial (i.e., man-made) ground-based calibration devices (i.e., calibrators) with known scattering or transmission properties, and (2) receiving signals from natural scatterers with assume signal scattering properties.

The first approach has the advantage that calibration accuracy is limited only by the precision with which the ground-based calibrators can be built, maintained, and oriented. However, such mapping processes are constrained from a practical standpoint by the need to locate the calibrators in areas where the calibrators can be clearly detected. That is, in areas having low signal scattering. Such areas, of course, can be difficult to provide in certain regions of interest. Further, a plurality of such calibrators can be required within each scene for which calibration is required, thereby entailing increased ground support.

Mapping processes using a combination of the above-mentioned two approaches have been proposed to reduce the number of required ground-based artificial calibrators. Such processes have been developed for calibrating data using a single artificial ground-based calibrator together with selected observations of natural signal scatter. However, such processes typically assume reciprocity of the radar system. That is, the transmit imbalance and cross-talk are assumed to be equal to the equivalent receive values. Moreover, such processes also assume the cross-talk terms are small so that the calibration computations can be linearized. with this latter assumption, the cross-talk terms can be determined using signal scattering measurements, but the artificial calibrator is still required to obtain the channel imbalance calibration coefficients. Further, such processes require an initial estimate of the calibration coefficients and converges to the final values through an interactive process. Alternatively, mapping processes using both the above-mentioned approaches have also been developed that eliminate the reciprocity assumption. However, in either case the channel imbalance calibration coefficients are valid only in a local area of the artificial calibration. In fact, the channel imbalance calibration coefficients can vary by 25% or more across a region of interest having a transmitted signal incidence angle range of 25° which correspond to an amplitude variation of 1.9 dB. An array of ground-based calibrators is thus required to calibrate most regions of interest.

In yet another polarimetric signal mapping process that also uses a single ground-based artificial calibrator, the artificial calibrator is used to obtain all of the above calibration coefficients. However, the process is again limited in that the validity of the calibration is restricted to the vicinity of the calibrator. In addition, this process also assumes that the cross-talk calibration coefficients all have the same value, an assumption that is not satisfied by circuitry of many polarimetric radar signal mapping systems, including the current JPL AirSAR polarimetric radar transmitting and receiving system.

Also, for signals at frequencies below approximately 1 GHz that must travel through the ionosphere, Faraday rotations in the angle of a polarized radar signal occur which can distort the signal. The signal is distorted both during transmission to the region of interest and following the scattering of the signal from the region. Thus, such low frequencies have been avoided in prior art polarimetric signal mapping processes due to inadequate techniques in compensating for such Faraday rotations. However, polarimetric radar signals at such low frequencies are useful in penetrating deeply into areas with substantial vegetation. Thus, it would be advantageous for a spaceborne polarimetric radar signal mapping process to be able to use such low frequency signals for biomass or other applications and perform signal calibration to reduce the Faraday rotation angle distortion.

The present invention eliminates many of the above-mentioned drawbacks inherent in polarimetric signal calibration processes.

OBJECTIVES OF THE INVENTION

The following objectives are satisfied by the improved radar polarimetric radar signal mapping process of the present invention:
1. The process can be utilized at low frequencies with signals transmitted and received from spaceborne platforms.

2. The process reduces the number of ground-based calibrators required.
3. The process increases the accuracy of information obtained while reducing component requirements.

These and other advantages will be apparent from the detailed description below.

SUMMARY OF THE INVENTION

The invention is a novel polarimetric radar signal mapping process. That is, this novel process transmits, receives, calibrates and analyzes polarimetric radar signals in a manner that reduces signal distortions due to cross-talk, channel imbalance, and ionospheric Faraday rotations resulting from spaceborne polarimetric radar applications with low frequency signals penetrating an ionosphere. Thus, the invention is particularly useful in polarimetric radar image processing applications such as those using synthetic aperture radar (SAR) devices such as SIR-C and the JPL AirSAR.

The present invention transmits radar signals of two distinct polarizations and receives polarized scattered signals of two distinct polarizations deflected from a region of interest. Data relating to the region of interest are calibrated and analyzed to determine features of the region. The data are partitioned into pixels corresponding to subregions of the region of interest. The signal data is subsequently corrected or calibrated for various signal distortions, including cross-talk, channel imbalance and (if required) a Faraday rotation angle. These data may also be used subsequent to calibration to obtain mapping data corresponding to properties of a second region of interest, namely the ionosphere.

To calibrate the signal data for the above-mentioned distortions, the present invention uses a statistical analysis technique whereby values for entries of an expectation matrix are determined using a sampling of the signal data derived from polarized radar signals scattered from a sub-area of the region of interest. A collection of values for entries of the matrix are equated to corresponding theoretical expressions for the entries. In one embodiment, the theoretical expressions are a function of four complex cross-talk coefficients (equivalently, eight real unknowns), two complex channel imbalance coefficients (equivalently, four real unknowns), four real scattering statistical parameters characterizing random variables associated with a predetermined probability distribution function, and (if required) a real Faraday rotation angle unknown. The resulting set of novel non-linear equations can be solved simultaneously to obtain values for 15 of the above 16 or 17 real unknowns. Thus, by using certain predetermined constraints that typically occur in the architecture of the devices supporting the process and/or constraints on the region of interest, sufficient additional equations can be generated such that values for each of the unknowns can be determined. Thus, the resulting calibration coefficient values (including, if required, the Faraday rotation angle) derived from the values of the unknowns are subsequently used in determining the complex entries of a well known polarimetric calibration matrix whereby the calibration matrix is used in adjusting the region pixel data to correct for cross-talk, channel imbalance and (if required) the Faraday rotation angle.

The present invention can be used with instruments such as SIR-C and the JPL AirSAR synthetic aperture radars. The present invention can be used with spaceborne SAR instruments at P-band and other frequencies previously considered impractical to use due to Faraday rotation effects, high spatial resolution determination of Faraday rotation and ionospheric total electron content, ionospheric tomography, and geological surface/sub-surface mapping. Moreover, the present invention is also valid for both monostatic and bistatic radar systems.

While the process disclosed here is in terms of the radar mapping problems, it is in fact valid for any polarimetric wave scattering problem which can be formulated in terms of a signal scattering equation of the form shown in Equation 2 of the section below entitled, "Theory Section," where [R] and [T] are arbitrary signal distortion matrices.

BRIEF DESCRIPTION OF THE DRAWINGS

FIG. 4 is a flowchart providing further details of the polarimetric calibration process included in the present invention.

DETAILED DESCRIPTION

Figure 1:
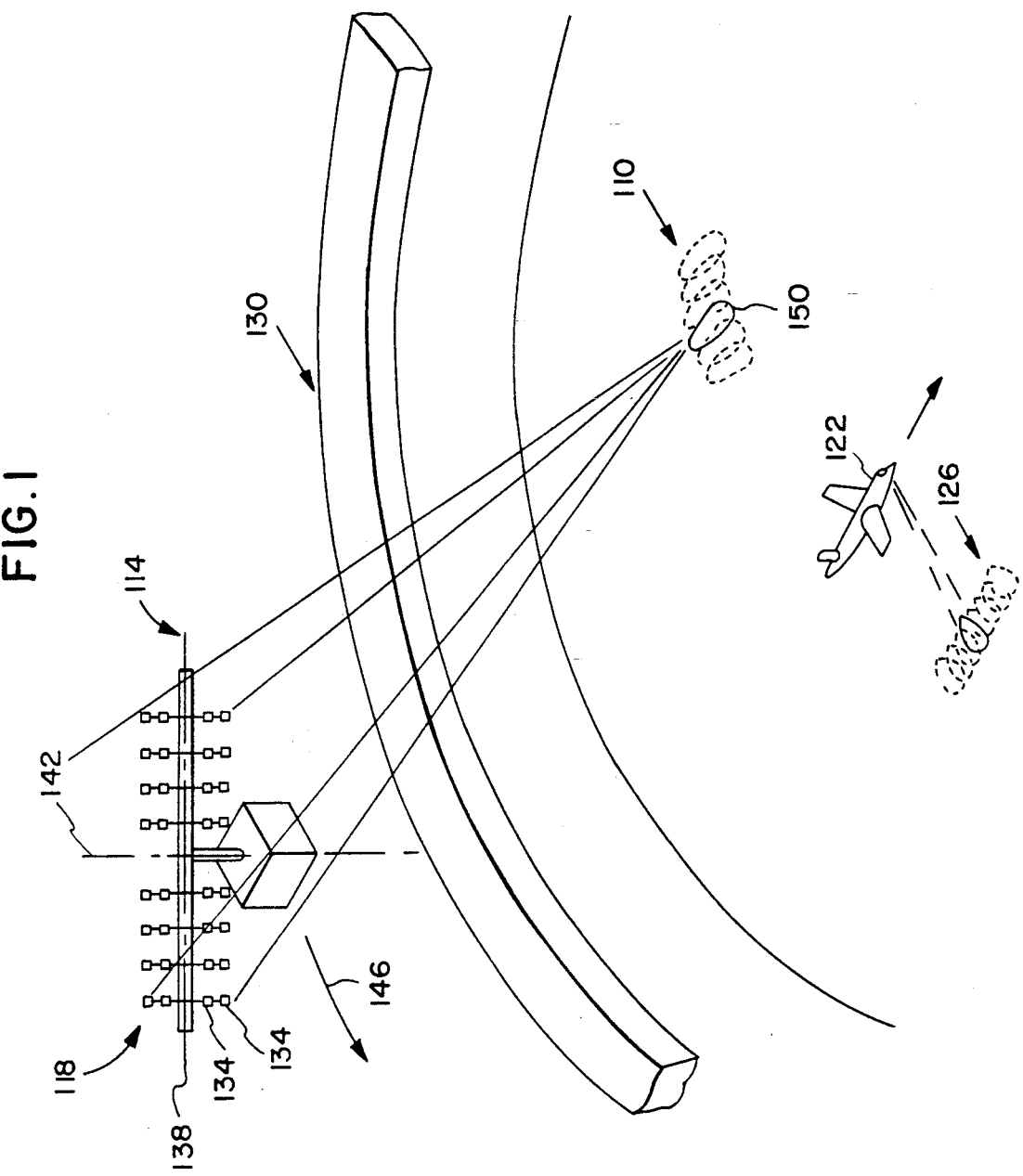
FIG. 1 illustrates two contexts within which the polarimetric radar signal mapping process of the present invention is of use.

The polarimetric radar signal mapping process of the present invention can be advantageously used in both spaceborne and airborne polarimetric radar systems. Of particular importance are the polarimetric radar systems known in the art as synthetic aperture radars (SARs) which simulate the capabilities of exceedingly large stationary radar antennas using the movement of a substantially smaller antenna along a predetermined path to obtain high spatial resolution features of a region. Thus, SAR systems are typically deployed on aircraft and satellites for imaging or determining various features of a geographical area. To illustrate at least two contexts wherein the present invention can be applied, reference is made to FIG. 1. In one context, a satellite 114 orbiting, for instance, the earth has an antenna 118 for both transmitting and receiving polarimetric signals regarding the earth based region 110. In another context, an aircraft 122 houses an antenna (not shown) for transmitting/receiving polarimetric signals toward/from a region 126. It should be noted that there is a difference between these two contexts with regard to the present invention. In particular, since the satellite 114 is within or above the ionosphere 130, there are ionospheric signal distortions that are significant for certain polarimetric signal frequencies (e.g., below approximately 1 GHz), for which the present invention calibrates. That is, the present invention performs polarimetric calibration for the satellite 114 signal transmission and reception which is unnecessary for the aircraft 122. More precisely, in the satellite 114 context, there are polarimetric signal distortions both when the transmitted signal traverses the ionosphere 130 toward the region 110 and when a scattered signal from region 110 traverses the ionosphere 130 toward the satellite 114. Such ionospheric distortions are characterized quantitatively in terms of a Faraday rotation angle, $\Omega$, indicating the angle a polarimetric signal is distorted or rotated as it passes through the ionosphere 130. Further, since it is known that $\Omega$ is dependent upon the polarimetric signal frequency, the magnetic field component along the direction of signal propagation, the electron density of the ionosphere 130, and the length of the path through the ionosphere, $\Omega$ can vary non-trivially such that the variations can impact the quality of the signal analysis performed on the received scattered signals. Thus, due to the Faraday rotation angle distortions, the satellite 114 context will, therefore, be the context within which the discussion will be heretofore substantially directed.

In particular, the polarimetric radar signal mapping process of the present invention will be described in the general case where the Faraday rotation angle, $\Omega$, is determined or taken into account as part of the polarimetric signal calibration process. As an aside, note that in describing the present invention in this context also illustrates the manner in which the invention applies to the aircraft 122 context where the Faraday rotation angle is not required. That is, as will become evident below, the Faraday rotation angle can be set to zero for such contexts as the aircraft 122.

Returning now to the satellite 114 context, the satellite antenna 118 includes one or more radar sensitive areas 134. Each such area 134 is used for both transmitting and receiving polarimetric radar signals of predetermined frequency and amplitude. The signals transmitted toward region 110 are of two different polarizations. That is, a first polarized signal beamed or transmitted toward the region 110 and a second polarized signal of a polarization distinct from the first signal is also beamed or transmitted toward the region 110. After the first polarized signal is transmitted, at least two polarizations of the first transmitted signal are deflected or scattered from the region 110 and some portion is detected or received by the areas 134. Preferably, one of the scattered polarizations received is the polarization of the first transmitted signal. Subsequent to transmission of the first polarized signal, the second polarized signal is beamed or transmitted toward the region 110 and, again, at least two polarizations of the signal scattered from the region 110 are received by the areas 134. Similar to the detection of the scattering of the first polarized signal, one of the received polarizations from the second scattering is preferably the polarization of the second transmitted polarized signal. Thus, in a typical implementation, the scattered signals received from transmission of the first and/or the second polarized signal are polarized signals having the two polarizations of the transmitted signals. Further, it is commonplace for the two polarizations to be orthogonal to each other. In fact, it is usually preferred that one such polarization signal have a horizontal polarization with respect to a horizontal axis 138 of the antenna 118 and the other polarization signal have a vertical polarization with respect to a vertical axis 142 of the antenna 118. However, with regard to the polarimetric radar signal analysis process of the present invention, no constraints on the polarity of either the first and the second transmitted signals or the received signals are imposed other than: (a) at least two polarimetric signals received from the scattering of a transmitted signal be detectably distinct, and (b) the first and second transmitted polarimetric signals must be polarimetrically distinct. Nevertheless, to simplify the discussion, the description hereinafter will be couched in terms of horizontally and vertically polarized signals on both transmission and reception with the letters "H" and "V" denoting the horizontal and vertical polarizations, respectively, of these signals. Thus, as the satellite 114 traverses its orbital path, as indicated by arrow 146, the satellite transmits horizontal and vertical polarimetric radar signals to the region 110 and, in addition, receives horizontal and vertical polarimetric radar signals scattered from the region 110. Thus, the satellite 114 typically gathers data relating to both horizontal and vertical signal scatterings from a plurality of signal "footprints" 150 whereby each footprint is a portion of region 110 that is illuminated by a single signal transmission.

As previously discussed, during the radar signal transmission and reception, numerous signal distortions can occur for which the present invention corrects. Such distortions include cross-talk, channel imbalance, noise from indeterminate sources, as well as the ionospheric distortions due to Faraday rotations. With regard to cross-talk, since each radar sensitive area 134 is electrically connected in a horizontally polarized signal transmitting circuit (not shown) for transmitting horizontally polarized signals and also connected in a separate vertically polarized signal transmitting circuit (also not shown) for transmitting vertically polarized signals, some amount of signal leakage (i.e., cross-talk) between these two transmission circuits distorts their respective signal transmissions. Similarly, each area 134 is connected in both a horizontally and a vertically polarized signal receiving circuit (not shown) for receiving horizontally and vertically polarized signals, respectively, scattered from region 110. Thus, a cross-leakage of received signals occurs whereby some portion of the horizontally polarized scattered signal is detected or leaks into the vertically polarized signal receiving circuit and, conversely, some portion of the vertically polarized scattered signal is detected or leaks into the horizontally polarized signal receiving circuit.

With regard to channel imbalance, since each of the above-mentioned circuits connecting to an area 134 is substantially distinct, variations or anomalies in these circuits can cause imbalances in polarimetric signal transmission between a horizontal signal transmission and a vertical signal transmission, or, between the reception of a horizontally scattered signal and a vertically scattered signal.

Since such polarimetric signal distortions can substantially degrade the quality of the data obtained regarding region 110, the present invention compensates for these distortions, as will be discussed below, without the need for precisely oriented ground-based signal calibrators (e.g., reflectors, signal generators, or other external calibrators) required of the signal calibration techniques in the prior art.

Figure 2:
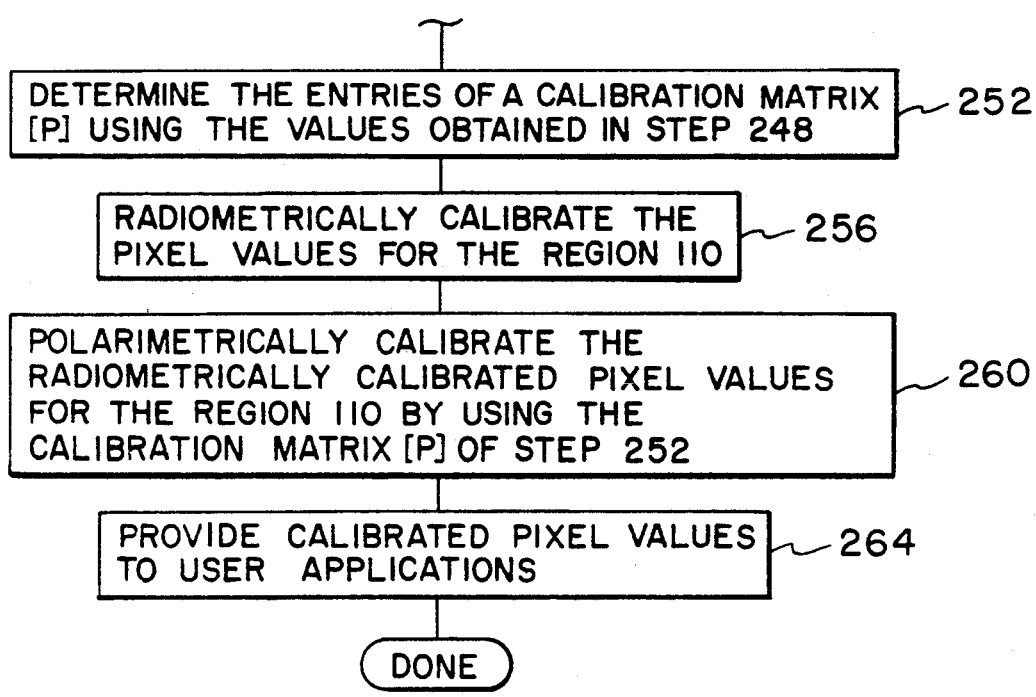
FIG. 2 is a flowchart of the high level process steps of the present invention.

Referring now to FIG. 2, a high level step diagram is presented of the polarimetric radar signal mapping process of the present invention. The diagram can be decomposed into four collections of steps. The first collection, steps 200 through 220, provide the signal transmission and signal data collecting capabilities of the process. The second collection, steps 24 through 252, determine the values for a 4×4 complex polarimetric calibration matrix [P] to be used to polarimetrically calibrate the pixels corresponding to region 110. The third collection, steps 256 and 260, use the matrix [P] to calibrate pixels corresponding to region 110 (and perhaps further regions of interest) to reduce distortions in the scattered signals received by the antenna 118. In particular, by using the matrix [P], the pixels are polarimetrically calibrated to reduce cross-talk, channel imbalance and ionospheric Faraday distortions. The fourth collection, consisting of the step 264, provides the newly calibrated pixels to user applications to perform various analyses of the features of region 110.

In describing FIG. 2 in detail, steps 200 through 220 are performed iteratively such that signal data is iteratively gathered for region 110 until there is sufficient signal data for deriving an accurate data record or pixel corresponding to each of a plurality of subregions of region 110. Note that since, by definition, each pixel is the smallest unit of imaging to be obtained, each subregion is a contiguous portion of the region 110 with no image data regarding sub-structure used. Further, to better clarify how steps 200 through 220 accomplish their purpose, note that during these data gathering steps the satellite 114 transmits a first plurality of series of horizontally polarized pulses and a second plurality or series of vertically polarized pulses toward region 110. With regard to either series, each pulse preferably has a distinct footprint 150 offset somewhat from any previous pulse of the series. Thus, substantially all locations of region 110 are polarimetrically illuminated by a plurality of the pulses of a series. In fact, each subregion preferably is included in the set of all locations of region 110 illuminated by the same pulses and where each subregion R is distinguishable from any other subregion illuminated by the pulses illuminating R using the time delay between transmission and reception of the pulses. Said another way, each pixel for an image of region 110 is obtained using signal data obtained from the signal scattering of a plurality of the pulses from both the horizontally polarized pulse series and the vertically polarized pulse series. Thus, the data for each pixel is obtained using the four scattered signal portions:

(a) the received horizontally polarized signals resulting from the transmission of the horizontally polarized transmitted pulses that illuminate the subregion corresponding with the pixel;
(b) the received vertically polarized signals resulting from the transmission of the horizontally polarized transmitted pulses that illuminate the subregion corresponding with the pixel;
(c) the received horizontally polarized signals resulting from the transmission of the vertically polarized transmitted pulses that illuminate the subregion corresponding with the pixel; and
(d) the received vertically polarized signals resulting from the transmission of the vertically polarized transmitted pulses that illuminate the subregion corresponding with the pixel.

Thus, in performing the steps 200 through 220 the transmissions of pulses from the horizontally polarized series of pulses and the vertically polarized series of pulses are preferably alternated and transmitted at predetermined intervals toward region 110 as the satellite 114 traverses its orbital path. Thus, scattering signal image data is gathered from a large plurality of transmitted pulses illuminating various portions of region 110 in an overlapping fashion until the region 110 is no longer illuminated by the pulses.

Thus, for example, data measurements for the entire region 110 can be collected in steps 200 through 220 prior to other processing steps being performed. Thus, in step 200, a determination is made as to which portion or footprint of the region 110 a polarimetric signal is to be transmitted by the satellite 114. Since both a horizontally polarized signal and a vertically polarized signal are transmitted to each portion, this step preferably changes the direction of the transmitted signal only after both the horizontally and vertically polarized signals have been transmitted toward the substantially same portion of region 110. In step 204, a determination is made as to which of the horizontal or vertical polarizations the next signal transmitted by the satellite 114 should have. In step 208, a polarimetric signal having the polarization determined in step 204 is transmitted toward the portion of region 110 determined in step 200. In step 212, the antenna 118 receives polarized signals scattered from the portion of region 110 to which the signal was directed. In step 216, samples of the received signals are measured and the values obtained are stored. Subsequently, a determination is made as to whether there is more signal data to be gathered via the steps 200 through 220. If so, these steps are of course repeated. Note that steps 200 through 220 can be used to gather polarimetric signal data corresponding to any portion of region 110 a plurality of times. That is, for a given portion of region 110 the radar subsystem 308 can perform the steps 200 through 220 one or more times collecting data corresponding to the portion each time. Alternatively, if in step 220 it is determined that sufficient data has been gathered, then in step 224 the stored data samples, generated in step 216, are used to determine pixel values. Each pixel includes values determined by one or more of the stored data samples resulting from one or more, both horizontal and vertical, signal scatterings received from a subregion of the region 110 corresponding to the pixel. In particular, when the data are represented in what is known in the art as scattering matrix format, each pixel includes four complex data values $p_1$, $p_2$, $p_3$, and $p_4$ where:

(a) $p_1$ is a measurement of the horizontally polarized signal received from the horizontally polarized signal transmitted;
(b) $p_2$ is a measurement of the horizontally polarized signal received from the vertically polarized signal transmitted;
(c) $p_3$ is a measurement of the vertically polarized signal received from the horizontally polarized signal transmitted; and
(d) $p_4$ is a measurement of the vertically polarized signal received from the vertically polarized signal transmitted.

In step 228, a predetermined selection of the pixels for region 110 is selected and the pixels in this selection are radiometrically calibrated. That is, for each pixel in this selection, the pixel has its values $p_1$, $p_2$, $p_3$ and $p_4$ calibrated or corrected to compensate for known phase and amplitude distortions within the received scattered signals due to variations in the angle and distance the satellite 114 is from each pixel subregion in the region 110 during signal transmission.

In step 232, a sampling of the radiometrically calibrated selected pixels is performed. The pixels in the sampling are used in determining polarimetric calibration parameters which, in turn, are used to calibrate or correct the pixel data for the entire region 110. More precisely, the values of the pixels within the sampling are used to obtain values of an expectation matrix [Q] for a novel statistical technique employed by the present invention to determine the polarimetric calibration parameters. The pixel sampling obtained must satisfy the following two criteria:

(a) the set of pixels within the sampling have a statistical distribution approximating the ensemble statistics of substantially every individual pixel within the sample; and (b) any variation in the polarimetric calibration parameter values within the sample should be small.

Further, the pixels within the sampling do not need to be contiguous, thereby allowing the exclusion of anomalous areas of region 110 for which the novel statistical technique would be less effective.

Subsequently, in step 236, the values of the 4×4 complex expectation matrix [Q] are determined using the radiometrically calibrated pixels of the sampling. The matrix entry values for [Q] are determined by using a predetermined probability distribution function, denoted the "scattering probability distribution function." The scattering probability distribution function is the statistical distribution of random statistical variables corresponding to the measurements of the received scattered signals in the absence of radiometric variations, cross-talk, channel imbalance and any ionospheric Faraday distortions. There are four such random variables, also known as "scattering coefficients." They are:

(a) $S_{HH}$, presenting the measurements of the horizontally polarized signal received from a horizontally polarized signal transmitted;
(b) $S_{HV}$, presenting the measurements of the vertically polarized signal received from a horizontally polarized signal transmitted;
(c) $S_{VH}$, presenting the measurements of the horizontally polarized signal received from a vertically polarized signal transmitted; and
(d) $S_{VV}$, presenting the measurements of the vertically polarized signal received from a vertically polarized signal transmitted.

Thus, the scattering coefficients correspond to the scattered signal measurements calibrated to remove the above-mentioned signal distortions. Note that the expectation matrix [Q] and the scattering coefficients are described in greater detail in the Theory Section below which provides further details of a theoretical nature.

In step 240, a first collection of 15 non-linear equations, denoted expectation equations, are determined. Each expectation equation is the result of equating a value for a predetermined entry of [Q] with a predetermined theoretical expansion of the entry. As detailed in the Theory Section, each expansion is a function of at least four complex unknowns related to cross-talk, two complex unknowns related to channel imbalance, a real unknown representing the Faraday rotation angle, and four real valued statistical parameters of the scattering coefficients. The above unknowns can be represented by a total of 17 real unknowns, if the Faraday rotation angle is unknown, and 16 real unknowns otherwise. Thus, the 15 expectation equations do not provide sufficient information to solve for the 16 or 17 real unknowns. However, in step 244, a second collection of equations is determined which is used to supplement the expectation equations such that there are a sufficient number of equations to solve for all unknowns. This second collection of equations is derived from satellite 114 or aircraft 122 implementation characteristics that create additional constraints among the unknowns. In particular, such additional constraints typically include:

(a) One of the unknowns is known from, for example, previous data calibrations. This is a viable technique if it is determined that the unknown is relatively invariant spatially and temporally;
(b) One of the unknowns is determined to be small enough to have substantially no impact on the determination of the other unknowns; and
(c) There is a known relationship between at least two of the unknowns. Possible relationships in this regard include radar system reciprocity where one or several of the channel imbalances and/or cross-talk signal distortions are substantially identical on both the polarimetric signal transmitting and receiving. Such a constraint is described by Klein in "Calibration of Complex Polarimetric SAR Imagery Using Backscatter Correlations," *IEEE Trans. Aerospace Elect. Sys.*, 28,183, 1992.

Subsequently, in step 248, the set of equations obtained by combining the first and second equation collections is solved substantially simultaneously for the above-mentioned 16 or 17 real unknowns depending, again, on whether the Faraday rotation angle is known or unknown. Note that solving techniques for this set of equations are well known in the art. For example, a Newton-Raphson technique can be used. Further discussion of such techniques is provided in the Theory Section below.

Following the determination of the complex cross-talk, channel imbalance and (if required) the Faraday rotation angle using the values of the 16 or 17 real unknowns determined in step 248, in step 252 the entries of a complex 4×4 calibration matrix [P] are obtained. The matrix [P] is used, subsequently in step 260, to calibrate or correct region 110 pixel values for cross-talk, channel imbalance and (if required) the Faraday rotation angle. For example, if $(W_1, W_2, W_3, W_4)^T$ represents a pixel as a 4×1 scattering matrix where "$T$" denotes the transpose matrix operator and $W_1$ = a measurement of the horizontally polarized signal received from a horizontally polarized signal transmitted;
$W_2$ = a measurement of the horizontally polarized signal received from a vertically polarized signal transmitted;
$W_3$ = a measurement of the vertically polarized signal received from a horizontally polarized signal transmitted; and
$W_4$ = a measurement of the vertically polarized signal received from a vertically polarized signal transmitted;

then $[P]^*(W_1, W_2, W_3, W_4)^T$ is a 4×1 complex matrix: $(C_1, C_2, C_3, C_4)^T$ where $C_i$ is the measurement $W_i$ calibrated for cross-talk, channel imbalance and (if required) the Faraday rotation angle.

In step 256, at least the pixel values corresponding to the region 110 that have not been radiometrically calibrated are in this step radiometrically calibrated such that the output of this step is radiometrically calibrated pixels for the entire region 110. Subsequently, in step 260, the polarimetric calibration matrix [P] is used to polarimetrically calibrate each pixel output in step 256.

Finally, in step 264 the polarimetrically calibrated pixels output from step 260, along with auxiliary information describing the radar system, processing characteristics, and calibration, are provided to various user applications for analysis of the features of the region 110. Such applications include biomass analysis and soil moisture content. Further, the calibration information can itself be used to provide information of interest to some applications, in particular ionospheric mapping and tomography. For ionospheric applications, the Faraday rotation values associated with each calibration sampling are identified in step 264 and stored as an array of values with each array entry representing a Faraday rotation angle and a geographical location corresponding to a geographical location associated with the subregions included in the calibration sampling. Preferably, this step includes storing the calibrated pixel values on an application accessible storage means such as a magnetic or optical disk.

Figure 3:
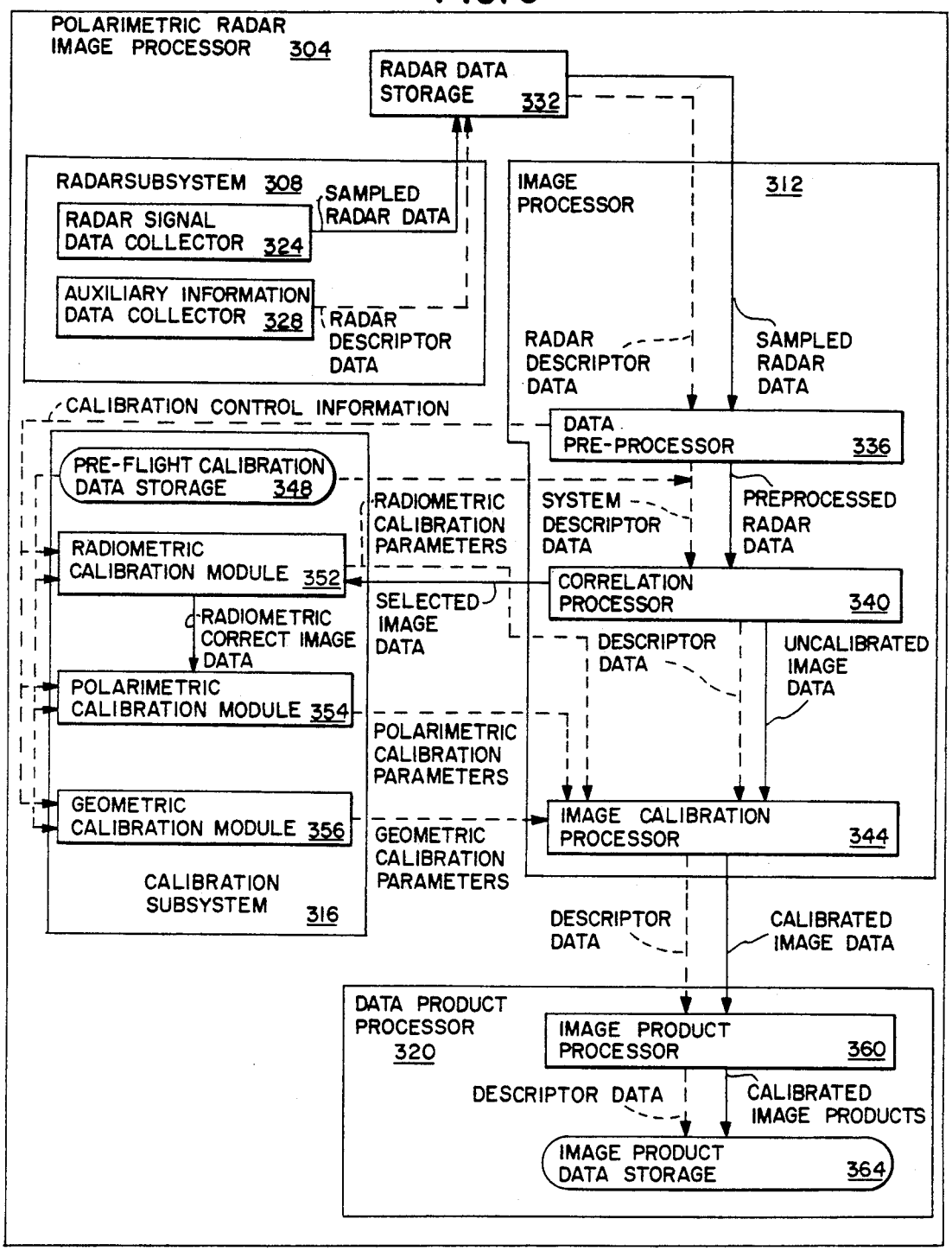
FIG. 3 is a block diagram illustrating one embodiment of a portion of the process of the present invention.

Referring now to FIG. 3, a block diagram is given presenting a portion of the novel polarimetric radar signal mapping process of the present invention embodied in a polarimetric radar image processor 304. Within the diagram, primary data flow paths are indicated by solid lines, while auxiliary data flows indicating data for controlling and describing the primary data flows are indicated by dashed lines. As illustrated, there are four major subsystems to the polarimetric radar image processor 304. That is, the four major subsystems are:

(a) a radar subsystem 308 for performing the steps 200 through 220 of FIG. 2. That is, the radar subsystem 308 collects and samples (e.g., digitizing) analog signal data received by the antenna 118 corresponding to the region 110 (alternatively, region 126);

(b) an image processor 312 for performing, among other things, the steps 224, 256 and 260 of FIG. 2. Thus, the image processor 312 uses the raw (i.e., unformatted) digitized or sampled data output by the radar subsystem 308 to create images of the region 110;

(c) a calibration system 316 for performing the steps 228 through 252 of FIG. 2. Thus, the calibration system 316 determines certain auxiliary measurements or parameter values which are required for calibrating or correcting image data of the region 110; and (d) a data product processor 320 for performing the step 264 of FIG. 2. That is, the data product processor 320 provides for user manipulation of the calibrated image data output by the image processor 312.

In addition, a controller (not shown), having functionality well known in the art, is required to coordinate the operations of the above four subsystems.

In the radar subsystem 308, data are obtained by transmitting and receiving the horizontally and vertically polarized signals via antenna 118. During this process, the received signals are sampled and captured in the radar signal data collector 324. In addition, auxiliary measurements are made and collected in the auxiliary information collector 328. The auxiliary information collected includes radar status information such as operational modes, gain statuses and altitude/ephemeris information and, in addition, radar performance capabilities such as built-in test (bit) measurements and temperature sensor measurements. Both the collected radar signal data and the collected auxiliary information are, in substantially real time, transferred to a radar data storage collector 332 which serves as a data buffer between the processing of the radar subsystem 308 and the subsequent processing of the image processor 312. For expediency, data residing in the radar storage 332 are formatted such that the auxiliary information is structured as a descriptor for a corresponding collection or block of radar signal data.

The image processor 312 requests the sampled radar data from the radar data storage 332 in substantially the order they are input from the radar subsystem 308. Both the sampled radar data and the corresponding radar descriptor data are input to a data preprocessor 336. The data preprocessor 336 reformats both the sampled radar data and the descriptor data into formats acceptable by a correlation processor 340. In addition, the data preprocessor 336 also outputs portions of the descriptor data to the calibration subsystem 316. In particular, the following data are output to the calibration subsystem 316: operational modes, gain statuses, altitude/ephemeris information, bit measurements and temperature measurements. Upon receiving the preprocessed radar data and descriptor data, the correlation processor 340 manipulates the data to obtain uncalibrated image data corresponding to the scattering properties of region 110. That is, the pre-processed radar data are range and azimuth compressed in the correlation processor 340 to obtain a raw image data in pixel form such that the data for each pixel are in scattering matrix format, Stokes matrix format, or cross-product matrix format. Further, note that multi-look radar signal processing involving non-coherent summation of signal data is preferably also included in the correlation processor 340 when generating Stokes or cross-product pixel data. However, for example, for data in scattering matrix format, the correlation processor 340 generates uncalibrated image data in the form of pixel values, $p_1$, $p_2$, $p_3$, and $p_4$ as noted in step 224 of FIG. 2. In addition, the correlation processor 340 supplies image data corresponding to a predetermined portion of the uncalibrated image data to the calibration subsystem 316 such that calibration parameter values can be generated for use by the image calibration processor 344. Subsequently, the correlation processor 340 also outputs the uncalibrated image data to the image calibration processor 344 which calibrates or corrects the image data (according to the steps 256 and 260 of FIG. 2) with respect to the calibration parameter values output by the calibration subsystem 316.

Subsequently, after the operation of the correlation processor 340, the calibration subsystem 316 generates calibration information used by the image calibration processor 344 in calibrating the image data received from the correlation processor 340. To accomplish this, the calibration subsystem 316 includes a pre-flight calibration data storage 348 for storing measurements characterizing the radar subsystem 308. The stored measurements are used by the calibration modules 352, 354 and 356 included within the calibration subsystem 316. The pre-flight calibration data storage 348 includes, for example, pre-flight measurements of antenna 118 patterns obtained using test equipment and previously determined calibration parameter values.

The radiometric calibration module 352 determines parameter values which are used to radiometrically calibrate or correct the pixel values of region 110 image data. The radiometric calibration parameters are determined by taking into account the phase and amplitude variations in the antenna 118 pattern across the transmitted signal. In addition, selected image data of the uncalibrated image data is input to this module from the correlation processor 340. This input is radiometrically calibrated and subsequently passed to the polarimetric calibration module 354 for use in determining values for the polarimetric calibration parameters which are, in turn, output to the image calibration processor 344.

As previously discussed, the polarimetric calibration module 354 of the present invention determines polarimetric calibration parameter values for correcting radar signal distortions due to channel imbalances, cross-talk and system noise as well as any Faraday rotation angle distortions. That is, the polarimetric calibration module 354 performs steps 232 through 252 of FIG. 2. Thus, in doing so, the module outputs the 4×4 complex polarimetric calibration matrix [P] containing the polarimetric calibration parameter values to be used by the image calibration processor 344. To provide this output, the novel polarimetric calibration module 354 executes the program presented in FIG. 4 and discussed below. The input required for this module, and the program of FIG. 4, includes noise power parameter values obtained via the calibration control information and, additionally, radiometrically corrected image data as noted previously. However, it should be noted that the program of FIG. 4 does not require the image data being radiometrically calibrated. That is, the program of FIG. 4 can also be used with non-radiometrically calibrated image data.

With regard to the geometric calibration module 356, this module provides geometric calibration parameter values to the image calibration processor 344 which allows for geometric image corrections with respect to the angle of incidence of the radar signal when scattering from region 110. Further, the geometric calibration parameter values may also correct image data to account for topographical variations in region 110.

Subsequently, when all inputs are provided to the image calibration processor 344, this processor produces calibrated image data equivalent to the uncalibrated image data such that the calibrated image data accurately represents either the absolute or relative radar signal scattering properties of the region 110. In doing this, the calibration processor 344 first radiometrically calibrates the uncalibrated image data output by the correlation processor 340 using the radiometric calibration parameters output by the radiometric calibration module 352. In scattering matrix format, the radiometrically calibrated data can be represented for each pixel as a $4 \times 1$ complex data matrix $[\tilde{V}] = (\tilde{V}_1, \tilde{V}_2, \tilde{V}_3, \tilde{V}_4)^T$ where the $\tilde{V}_i s$ can be defined as:

(a) $\tilde{V}_1$ is the radiometrically calibrated measurement of the horizontally polarized signal received from a horizontally polarized signal transmission;

(b) $\tilde{V}_2$ is the radiometrically calibrated measurement of the horizontally polarized signal received from a vertically polarized signal transmission;

(c) $\tilde{V}_3$ is the radiometrically calibrated measurement of the vertically polarized signal received from a horizontally polarized signal transmission; and (d) $\tilde{V}_4$ is the radiometrically calibrated measurement of the vertically polarized signal received from a vertically polarized signal transmission.

Alternatively, the $\tilde{V}_i$, $1 \leq i \leq 4$ can be represented by a $2 \times 2$ data matrix $$[V] = \begin{pmatrix} V_{11} & V_{12} \\ V_{21} & V_{22} \end{pmatrix}$$

where $V_{11} = \tilde{V}_1$, $V_{12} = \tilde{V}_2$, $V_{21} = \tilde{V}_3$ and $V_{22} = \tilde{V}_4$. Subsequently, the polarimetric calibration matrix $[P]$ is used, as in step 260 of FIG. 2, to polarimetrically calibrate the radiometrically calibrated image data pixels.

Following this, the newly calibrated image data and selected descriptor data are output to the image product processor 360 which, in turn, manipulates the image data to emphasize different aspects of the image such as total signal power and channel-to-channel phase differences. Finally, the output from the image product processor 360 is provided to the image product storage 364 such that the image data can be subsequently accessed by users.

To described the polarimetric calibration module 354 in more detail, the high level steps of the module are presented in FIG. 4 and discussed below. Following this, in the Theory Section, further details are given which substantiate the steps of FIG. 4. In providing a description of the steps of FIG. 4 and the reasoning for these steps, pixel data are represented in scattering matrix format as a $4 \times 1$ matrix and a $2 \times 2$ matrix. To distinguish between these two notations, hereinafter the following notation will be used: for any $2 \times 2$ matrix identifier $$[W] = \begin{pmatrix} W_{11} & W_{12} \\ W_{21} & W_{22} \end{pmatrix}$$

$[\tilde{W}]$ will denote the $4 \times 1$ version of the matrix $[W]$ where $[\tilde{W}] = (\tilde{W}_1, \tilde{W}_2, \tilde{W}_3, \tilde{W}_4)^T$ such that $W_{11} = \tilde{W}_1$, $W_{12} = \tilde{W}_2$, $W_{21} = \tilde{W}_3$, and $W_{22} = \tilde{W}_4$.

As mentioned with reference to FIG. 3, there are two data inputs to the polarimetric calibration module 354: image data that, in the context of FIG. 3, has been radiometrically calibrated via the radiometric calibration module 352 and the noise power data from the data preprocessor 336. With respect to the image data input to the program of FIG. 4, each pixel of this image data is preferably in scattering matrix format, Stokes matrix format, or cross-product matrix format. For simplicity of discussion, FIG. 4 is presented in terms of the scattering matrix format. The noise power data input to the program of FIG. 4 consists of a noise power matrix $[Q_n]$. Each non-zero entry $n_i^2$, $1 \leq i \leq 4$, of $[Q_n]$ corresponds to a noise power coefficient used in the polarimetric calibration process. That is, (a) $n_1^2$ = the noise power for satellite 114 circuits where a horizontally polarized signal is transmitted and a horizontally polarized signal is received;

(b) $n_2^2$ = the noise power for satellite 114 circuits where a vertically polarized signal is transmitted and a horizontally polarized signal is received;

(c) $n_3^2$ = the noise power for satellite 114 circuits when a horizontally polarized signal is transmitted and a vertically polarized signal is received; and (d) $n_4^2$ = the noise power for satellite 114 circuits where a vertically polarized signal is transmitted and a vertically polarized signal is received.

To briefly summarize the program of FIG. 4, the program determines the entries of the $4 \times 4$ complex calibration matrix $[P]$ which is used by the image calibration processor 344 to adjust or correct pixel values corresponding to a portion of the region 110. More precisely, for pixels in scattering matrix format $[\tilde{V}]$, the $4 \times 1$ complex matrix $[P]*[\tilde{V}]$ yields, modulo a complex amplitude scalar factor, the polarimetric calibrated values for the entries of $[\tilde{V}]$. In other words, the entries of $[P]*[\tilde{V}]$ are values for the scattering coefficients for each pixel of region 110. That is, the scattering coefficients are entries of a "scattering matrix" $[\tilde{S}] = (\tilde{S}_1, \tilde{S}_2, \tilde{S}_3, \tilde{S}_4)^T = [P]*[\tilde{V}]$, where $\tilde{S}_1$ is the value for $S_{HH}$ corresponding to $\tilde{V}_1$, $\tilde{S}_2$ is the value for $S_{VH}$ corresponding to $\tilde{V}_2$, $\tilde{S}_3$ is the value for $S_{HV}$ corresponding to $\tilde{V}_3$, and $\tilde{S}_4$ is the value for $S_{HH}$ corresponding to $\tilde{V}_4$.

Referring now to FIG. 4 in detail, in step 400 the noise power matrix $[Q_n]$ and the selected image data pixel values including $[\tilde{V}]$ are input to the module. Subsequently, steps 404 through 412 correspond to step 236 of FIG. 2. That is, in step 404 a $4 \times 4$ complex "cross-product" matrix $[Z]$ is formed for each input pixel value $[\tilde{V}]$. That is, $[Z]$ is a matrix each of whose entries are complex conjugate products of pairs of entries of the matrix $[\tilde{V}]$. The cross-product matrix $[Z]$ is a percursor to the expectation matrix $[Q]$ where the sampling for $[Z]$ consists of a single pixel. Preferably, $[Z] = [\tilde{V}]^*[\tilde{V}]\dagger$ where $\dagger$ denotes the complex conjugate transpose of $[V]$ if the pixel data $[\tilde{V}]$ is in scattering matrix format. However, variations for the matrix $[Z]$ are also contemplated. In particular, variations for $[Z]$ can be obtained from substantially any computational process using entries of the matrix $[\tilde{V}]^*[\tilde{V}]\dagger$ whereby the matrix $[\tilde{V}]^*[\tilde{V}]\dagger$ can be recovered from entries of the matrix $[Z]$. Thus, such operations as a scalar multiple, linear combination, or rearrangement of entries of $[\tilde{V}]^*[\tilde{V}]\dagger$, or, rearrangement of the real and imaginary parts of these entries are contemplated. Alternatively, if the input pixel data is in Stokes format, then substantially the same values for the entries of $[Z]$ can be obtained directly using appropriate combinations of the Stokes matrix entries. Further, note that if the input pixel values are already in cross-product matrix format, the entries of $[Z]$ can be obtained directly from the cross-product matrix entries. In step 408, a sampling of the input pixel values $[\tilde{V}]$ is obtained such that the sample pixel values are deemed to represent portions of region 110 having substantially constant coefficients for cross-talk, channel imbalance and Faraday rotation angle. To accomplish this, the pixels related to the sampling are preferred to reside substantially in an area of substantially constant vertical orientation (with satellite direction 146 designated the horizontal orientation and vertical axis 142 indicating the vertical orientation). In step 412, the matrices $[Z]$ corresponding to the pixels of the sampling are averaged to obtain values for the entries of the expectation matrix $[Q]$. That is, to obtain the $ij^{th}$ entry of $[Q]$, the $ij^{th}$ entries of each $[Z]$ in the sampling are averaged.

The subsequent steps, steps 416 through 424, are equivalent to step 240 of FIG. 2. In step 416, a scattering probability distribution function is selected that most closely matches the statistical characteristics of the sampling chosen in step 408. That is, the distribution of each entry, $\tilde{V}_i$, $1 \leq i \leq 4$, of the $[\tilde{V}]$ for the pixels of the sampling is examined and a scattering probability distribution function is chosen. In the present embodiment, the scattering probability distribution function is preferred to be one of: a zero-mean Gaussian distribution function or a k-distribution. In step 420, a collection of entries of $[Q]$ are chosen such that each such entry is equated with a corresponding theoretical expansion where the expansions are in terms of unknowns related to cross-talk, channel imbalance, the Faraday rotation angle, and statistical parameters of the scattering coefficients. As discussed in the Theory Section below, the entries $Q_{ij}$ of $[Q]$ chosen preferably are: $Q_{11}$, $Q_{12}$, $Q_{13}$, $Q_{14}$, $Q_{22}$, $Q_{23}$, $Q_{24}$, $Q_{33}$, and $Q_{34}$. Subsequently, step 428 is encountered. This step is identical to step 244 of FIG. 2 and therefore will not be further discussed.

Steps 432 and 436 correspond to step 248 of FIG. 2. In step 432, the noise values, $n_i^2$, $1 \leq i \leq 4$, of $[Q_n]$ are subtracted from the equations contained in steps 424 and 428. Note that the appropriate subtractions performed here are well known in the art and are indicated in the Theory Section for the expectation equations generated in step 424. In step 436, the combined equations generated in step 424 and 428 are solved for the unknowns as described in step 248 of FIG. 2. Finally, in step 440, the polarimetric calibration matrix $[P]$ is determined as in step 252 of FIG. 2. Note that the determination of $[P]$ is well known in terms of the complex cross-talk parameters, the channel imbalance parameters, and the real Faraday rotation angle. In fact, $[P] = [D]^{-1}$ where $[D]$ is defined at reference (21) of the Theory Section.

THEORY SECTION

1. Introduction.

The generic form of the received signal for a polarimetric radar signal analysis process is given in the paper, "Calibration of Stokes and Scattering Matrix Format Polarimetric SAR Data," *IEEE Trans. Geosci. Remote Sens.*, 30,531, 1992 by Freeman, Van Zyl, Klein, Zebker and Shen. The equation presented there with an added noise matrix $$\begin{pmatrix} N_{11} & N_{12} \\ N_{21} & N_{22} \end{pmatrix} \tag{1}$$

is:

$$\begin{pmatrix} V_{11} & V_{12} \\ V_{21} & V_{22} \end{pmatrix} = Ae^{j\theta} \begin{pmatrix} 1 & \delta_2 \\ \delta_1 & F_R \end{pmatrix} \begin{pmatrix} S_{HH} & S_{VH} \\ S_{HV} & S_{VV} \end{pmatrix} \begin{pmatrix} 1 & \delta_3 \\ \delta_4 & F_T \end{pmatrix} + \begin{pmatrix} N_{11} & N_{12} \\ N_{21} & N_{22} \end{pmatrix}$$

where $V_{11}$, $V_{12}$, $V_{21}$, $V_{22}$ represent the pixel values discussed previously, the $S_{HH}$, $S_{VH}$, $S_{HV}$, and $S_{VV}$ are the scattering coefficients, also discussed previously, A is a real amplitude, $e^{j\theta}$ is a constant phase offset term representing the absolute phase of the observable matrix $[V]$. Further, $\delta_1$, $\delta_2$, $\delta_3$, $\delta_4$, $F_T$ and $F_R$ are calibration coefficients where $\delta_1$ and $\delta_2$ are the HV (i.e., horizontally transmitted and vertically received) and VH (i.e., vertically transmitted and horizontally received) complex cross-talk coefficients (or variables if values are unknown) on receive, $\delta_3$ and $\delta_4$ are similar HV and VH complex cross-talk coefficients (or variables if values are unknown) on transmit, $F_R$ and $F_T$ are the complex channel imbalance coefficients (or variables if values are unknown) between the H and V channels on receive and transmit, respectively, and $N_{ij}$ are the complex noise amplitude coefficients (or variables if values are unknown). As an aside, note that these calibration coefficients are used in generating the calibration matrix $[P]$ as presented in step 252 of FIG. 2.

Further note that (1) can be rewritten as:

$$[V] = Ae^{j\theta}[R]^T[S][T] + [N] \tag{2}$$

$$\text{where } [V] = \begin{pmatrix} V_{11} & V_{12} \\ V_{21} & V_{22} \end{pmatrix}$$

To accurately determine the values of the complex scattering coefficients or variables $S_{ij}$, the signal calibration coefficients or variables, $\delta_i$, $1 \leq i \leq 4$, for cross-talk and $F_T$, $F_R$ for channel imbalance must be known or determined by measurement. Variations over time are commonly observed in the cross-talk and/or channel imbalance coefficients, particularly in the phase contribution since phase paths are very sensitive to temperature variations. The values of calibration coefficients typically vary spatially within a region or image due to impedance variations in the antenna 118 as a function of off-boresight angle. That is, as a function of the deviation from the normal to the plane of the antenna 118. If absolute radiometric calibration is also required (as opposed to relative calibration where the value of A is not required where absolute calibration means using a known value for A), then knowledge of the overall amplitude A is needed. However, typically the satellite 114 instrument contributions to the overall amplitude A tend to vary less over time than do the cross-talk and channel imbalance coefficients because of the sensitivity of phase to thermal variations. This means that the overall amplitude calibration can be expected to be valid over a relatively longer operating period than values for the polarimetric calibration coefficients and therefore can be performed less often. In fact, for some applications, knowledge of A is not even required. The particular value of $\theta$ is generally considered to be unimportant since the absolute phase information is not of value in the mapping process.

The often used approach for calibrating both airborne and spaceborne polarimetric radars (i.e., determining values for the calibration coefficients such that the matrix [P] is accurate) is to rely on ground-based devices such as corner reflectors or active radar calibrators placed on the ground in an area which is to be imaged. This technique is sensitive to the orientation of such devices as well as being labor intensive. For some applications, placement of such ground-based calibrators may be impossible for geographical or political reasons. Spaceborne radars, in particular, have required a global network of ground-based calibrators to maintain reliable calibration of a polarimetric radar signal analysis process. Recently developed calibration approaches have attempted to minimize the number of required ground-based calibrators, but still require at least one such calibrator in any portion of a scene to be calibrated. A technique that eliminates the need for ground-based calibrators would greatly reduce the operational cost and complexity of a polarimetric radar signal analysis process.

The Faraday rotation angle introduced by the ionosphere must also be known and accounted for in spaceborne polarimetric radar signal mapping processes operating on signals with frequencies below approximately 1 GHz if the polarimetric data are to be meaningful. When the effects of the Faraday rotation angle are included, the matrix [V] becomes $$[V] = A e^{j\theta}[R]^T[G][S][G][T] + [N] \tag{3}$$

where the Faraday rotation matrix is $$[G] = \begin{pmatrix} \cos\Omega & \sin\Omega \\ -\sin\Omega & \cos\Omega \end{pmatrix} \tag{4}$$

with $\Omega$ being the one-way Faraday rotation angle, assumed here to be constant over the mapping data corresponding to the region 110. Techniques for incorporating Faraday rotation information measured by other techniques have been proposed; these are typically based on measurements of satellite signals, such as global positioning satellites (GPS), received at ground stations. Such techniques are quite accurate in the vicinity of the Faraday measurement, but tend to be operationally unacceptable due to limited geographic availability of Faraday measurement sites.

The present invention embodies a technique which requires no artificial targets within a scene for polarimetric calibration. The technique is based on statistical analysis of scattering signals within a small sub-image of the region 110 and can be used with data in scattering matrix format, Stokes matrix format, or cross-product matrix format.

2. The Modified Observable Equation

Combining terms within the observable matrix [V] results in a modified form of the observable equation given by $$[V] = A e^{j\theta}[\hat{R}_I]^T[\hat{S}][\hat{T}_I] + [N] \tag{5}$$

where the transmit and receive channel imbalance matrices are $$[\hat{T}_I] = \begin{pmatrix} 1 & 0 \\ 0 & F_T \end{pmatrix} \quad [\hat{R}_I]^T = \begin{pmatrix} 1 & 0 \\ 0 & F_R \end{pmatrix} \tag{6}$$

and the modified scattering matrix is given by $$[\hat{S}] = [\hat{R}_c]^T[G][S][G][\hat{T}_c] \tag{7}$$

where the cross-talk matrices are defined as $$[\hat{T}_c] = \begin{pmatrix} 1 & \delta_3/F_T \\ \delta_4 & 1 \end{pmatrix} \quad [\hat{R}_c]^T = \begin{pmatrix} 1 & \delta_2 \\ \delta_1/F_R & 1 \end{pmatrix} \tag{8}$$

By combining terms, $[\hat{S}]$ can be rewritten in the form $$[\hat{S}] = \sum_{k=0}^{8} g_k[J^k] \tag{9}$$

where $$[X] = [J^0] = \begin{pmatrix} X_{11} & X_{12} \\ X_{21} & X_{22} \end{pmatrix} \tag{10}$$

$$[J^1] = \begin{pmatrix} 0 & 0 \\ X_{11} & X_{12} \end{pmatrix} \quad [J^2] = \begin{pmatrix} X_{21} & X_{22} \\ 0 & 0 \end{pmatrix}$$

$$[J^3] = \begin{pmatrix} 0 & X_{11} \\ 0 & X_{21} \end{pmatrix} \quad [J^4] = \begin{pmatrix} X_{12} & 0 \\ X_{22} & 0 \end{pmatrix}$$

$$[J^5] = \begin{pmatrix} 0 & 0 \\ 0 & X_{11} \end{pmatrix} \quad [J^6] = \begin{pmatrix} 0 & X_{21} \\ 0 & 0 \end{pmatrix}$$

$$[J^7] = \begin{pmatrix} 0 & 0 \\ X_{12} & 0 \end{pmatrix} \quad [J^8] = \begin{pmatrix} X_{22} & 0 \\ 0 & 0 \end{pmatrix}$$

$$\tilde{X}_1 = X_{11} \equiv S_{HH}\cos^2\Omega - S_{VV}\sin^2\Omega + (S_{HV} - S_{VH})\sin\Omega\cos\Omega \tag{11}$$

-continued $\tilde{X}_2 = X_{12} \equiv S_{VH}\cos^2\Omega + S_{HV}\sin^2\Omega + (S_{HH} + S_{VV})\sin\Omega\cos\Omega$ $\tilde{X}_3 = X_{21} \equiv S_{HV}\cos^2\Omega + S_{VH}\sin^2\Omega - (S_{HH} + S_{VV})\sin\Omega\cos\Omega$ $\tilde{X}_4 = X_{22} \equiv -S_{HH}\sin^2\Omega + S_{VV}\cos^2\Omega + (S_{HV} - S_{VH})\sin\Omega\cos\Omega$ where $$[\tilde{X}] = \begin{bmatrix} \tilde{X}_1 \\ \tilde{X}_2 \\ \tilde{X}_3 \\ \tilde{X}_4 \end{bmatrix}$$

$g_0 \equiv 1$ (12)

$g_1 \equiv \dfrac{\delta_1}{F_R} \quad g_5 \equiv g_1 g_3$ $g_2 \equiv \delta_2 \quad g_6 \equiv g_2 g_3$ $g_3 \equiv \dfrac{\delta_3}{F_T} \quad g_7 \equiv g_1 g_4$ $g_4 \equiv \delta_4 \quad g_8 \equiv g_2 g_4$ The $k>0$ terms for $[\hat{S}]$ in equation (9) represent the perturbation of the nominal scattering matrix $[S]=[J^0]=[X]$ due to cross-talk contamination. That is, the matrix $[X]$ is a modified form of the true scattering matrix $[S]$, corresponding to scattering in the rotated reference frame of the polarized wave field at the ground.

Note that $[V]$ is now of similar form to the original observable matrix (Equation 2) except that the constituent terms have been replaced by their corresponding hatted versions and the cross-talk and Faraday rotation matrices have been incorporated into $[\hat{S}]$.

The measurement matrix $[V]$ is known as a scattering matrix data format since for a perfectly calibrated system $[V]$ corresponds to $[S]$ to within a scalar factor. Other data formats derived from $[V]$ are equally acceptable. For example, the data for each pixel could be represented in terms of the cross-product matrix $[Z]$ where $[Z] = (V_{11} V_{12} V_{21} V_{22})^T (V_{11} V_{12} V_{21} V_{22})$ A common data representation is a modified form of the cross-product format known as Stokes format. The Stokes matrix is a real symmetric 4×4 matrix with entries given by $F_{11} = 0.25 (Z_{11} + 2Z_{22} + Z_{44})$ $F_{12} = 0.25 (Z_{11} - Z_{44})$ $f_{13} = 0.5\, Re\, (Z_{12} + Z_{24})$ $F_{14} = 0.5\, Im\, (-Z_{12} = Z_{24})$ $F_{22} = 0.25 (Z_{11} - 2Z_{22} + Z_{44})$ $F_{23} = 0.5\, Re\, (Z_{12} - Z_{24})$ $F_{24} = 0.5\, Im\, (-Z_{12} + Z_{24})$ $F_{33} = 0.5\, Re\, (Z_{14} + Z_{22})$ $F_{34} = 0.5\, Im\, (-Z_{14})$ $F_{44} = 0.5\, Re\, (-Z_{14} + z_{22})$ where Re and Im indicate real and imaginary parts, respectively, $[Z]$ is defined above, and $S_{HV}=S_{VH}$ is assumed. For the purpose of this discussion, scattering matrix format will be used exclusively, although other formats are equally compatible with the technique.

3. Expectation Formulation

For a single image resolution element (i.e., pixel) corresponding to a subregion of the region 110 whose scattered polarimetric signals are being processed, the four complex observable equations are not sufficient to solve for the 21 unknowns (six complex calibration coefficients, four complex scattering coefficients, and the Faraday rotation angle). It is this lack of correspondence between the number of available equations and the number of unknowns that has made an adequate solution of the calibration problem elusive.

In the approach described here, the number of equations is increased and the number of unknowns is decreased to provide a set of N non-linear equations in N unknowns which can be solved directly. This is done using an expectation matrix formed from the observations $[V]$ by summing over pixels within a selected sampling of the pixels of subregions of the region to be calibrated. The expectation value of a function $q(p)$ is defined as $$\in \{q(p)\} = \int_{-\infty}^{\infty} q(p) f_p dp$$

where $f_p$ is the probability density function for the random variable p. An estimate of the ensemble value of $\in\{q(p)\}$ can be obtained by summing a sample of discrete events (in this case, measured values for a sample of pixels), with the estimate represented using the notation $$<q(p)> = \dfrac{1}{n} \sum_{i=1}^{n} q(p_i) \approx \in\{q(p)\}$$

where $p_i$ represents a sample of p.

An expectation matrix is a matrix whose terms are expectation values represented in either ensemble or sample estimate form.

In the particular approach described here, the expectation matrix takes the form of a covariance matrix where $q(p)$ has the form $q(p)=pp^*$.

With an observable matrix $[\tilde{V}]$ for each pixel defined in terms of $[V]$ by $[\tilde{V}] = (V_{11} V_{12} V_{21} V_{22})^T$ (13)

the cross-product matrix can be defined as $[Z]=[\tilde{V}][\tilde{V}]\dagger$ and the elements of the expectation matrix $[Q]\equiv <[Z]>$ can be written as $$Q_{ij} = \Lambda_{ij} \sum_{k=0}^{8} \sum_{l=0}^{8} g_k g_l^* \Gamma_{ij}^{kl} + n_i^2 \delta_{ij}$$ (14)

where $\Gamma_{ij}^{mn}$ is the $ij^{th}$ entry of the 4×4 matrix $[\Gamma^{mn}] \equiv <[\tilde{J}^m][\tilde{J}^n]\dagger>$ (15)

where $mn, = 0, 1, ...., 8$, and $[\theta] = [\tilde{L}][\tilde{L}]\dagger$ where $[\tilde{L}] = A(1\ F_T F_R R_T F_R)^T$ (16)

Here $\dagger$ indicates complex conjugate transpose, $n_i^2$ is the receiver noise power in each channel HH, VH, HV and VV, and $\delta_{ij}$ is the Kronecker delta. Note that the tilde, used in $[\tilde{J}^m]$ and $[\tilde{J}^n]$, is employed, as previously mentioned, to represent the same $2 \times 2$ to $4 \times 1$ matrix transformation employed in Equation 13. Further note that the "spatial average" indicated by the angle brackets (i.e., "<" and ">") is performed over the selected sampling pixels of the region 110 for which polarimetric calibration is desired as described in step 412 of FIG. 4.

It is assumed that the polarimetric signal scattering process is ergodic, so that the population statistics of a single pixel are equivalent to the statistics of the spatial pixel distribution used to form the expectation matrix. Careful selection of the sampling used for calibration is important in assuring that this assumption is satisfied. In particular, calibration coefficients are expected to vary with elevation (i.e., vertically with respect to the direction of flight and normal to the plane of the antenna 118) but not azimuth (i.e., the direction of flight), so either the sampling area should have minimal width in the elevation direction or a plurality of samplings should be done at various elevation direction orientations. A detailed discussion of sampling selection is given in the Discussion subsection below. Moreover, the measurement process is also assumed stationary, i.e., both the scattering statistics and the calibration coefficients are assumed to be non-varying over the time period during which the data are obtained.

In this formation, three assumptions are made about the receiver noise:
1. The noise in the receiver channels is uncorrelated.
2. The noise and the signal are uncorrelated.
3. The noise powers in the receiver channels are time independent.

Note that each of the expectation terms $\Gamma_{ij}^{mn}$ can be written in the form $\Gamma_{ij}^{kl}$ where $$Y_{gh} = <\tilde{X}_g \tilde{X}_h^*> \quad (17)$$

$$\text{and } [\tilde{X}] = \begin{pmatrix} X_{11} \\ X_{12} \\ X_{21} \\ X_{22} \end{pmatrix} = \begin{pmatrix} \tilde{X}_1 \\ \tilde{X}_2 \\ \tilde{X}_3 \\ \tilde{X}_4 \end{pmatrix}$$

The $X_{ij}$s are defined in equations (11). The indices g,h are functions of i,j,k,l and are determined by the particular components of the $[\tilde{J}^m]$ and $[\tilde{J}^n]$ matrices for the indices i, j, k, and l.

Alternatively, the expectation matrix [Q] can be written in a form similar to that used by Klein in his previously cited paper, "Calibrator of Complex Polarimetric SAR Imagery Using Backscattering Correlations." That is, $$[Q] = A^2[D][Y][D]\dagger + [Q_n] \quad (18)$$

where $$[D] = \begin{pmatrix} 1 & \delta_4 & \delta_2 & \delta_2\delta_4 \\ \delta_3 & F_T & \delta_2\delta_3 & \delta_2 F_T \\ \delta_1 & \delta_1\delta_4 & F_R & \delta_4 F_R \\ \delta_1\delta_3 & \delta_1 F_T & \delta_3 F_R & F_R F_T \end{pmatrix} \quad (19)$$

$$[Y] = <[\tilde{X}][\tilde{X}]\dagger>$$

and $[Q_n]$ is the noise expectation matrix defined as $[Q_n] = <[\tilde{N}][\tilde{N}]\dagger>$. The primary difference between this formulation and that of Klein is the inclusion of the Faraday rotation angle terms in [Y]. Rewriting Equation 18 in terms of the scatterer expectation matrix $[C] = <[\tilde{S}][\tilde{S}]\dagger>$ gives $$[Q] = A^2[D][C][D]\dagger + [Q_n] \quad (20)$$

where $$[D] = \begin{pmatrix} u_1v_1 & u_3v_1 & u_1v_2 & u_3v_2 \\ u_2v_1 & u_4v_1 & u_2v_2 & u_4v_2 \\ u_1v_3 & u_3v_3 & u_1v_4 & u_3v_4 \\ u_2v_3 & u_4v_3 & u_2v_4 & u_4v_4 \end{pmatrix} \quad (21)$$

$u_1 = \cos\Omega + \delta_4\sin\Omega \quad v_1 = \cos\Omega - \delta_2\sin\Omega$
$u_2 = \delta_3\cos\Omega + F_T\sin\Omega \quad v_2 = \sin\Omega + \delta_2\cos\Omega$
$u_3 = -\sin\Omega + \delta_4\cos\Omega \quad v_3 = \delta_1\cos\Omega - F_R\sin\Omega$
$u_4 = -\delta_3\sin\Omega + F_T\cos\Omega \quad v_4 = \delta_1\sin\Omega + F_R\cos\Omega$ This form is simpler and easier to work with computationally than that in Equation 14, but Equation 14 is better suited to analysis since it explicitly illustrates the influence of the cross-talk terms on the expectation matrix.

Reciprocity of the scattering process implies $S_{HV} = S_{VH}$, a relation that is commonly assumed in radar imaging. With this assumption, [V] has only three linearly independent terms and the product $[Z] = [\tilde{V}][\tilde{V}]\dagger$ is a rank 1 matrix. The spatial average of these terms, given by $[Q] \equiv <[\tilde{V}][\tilde{V}]\dagger>$, is in general a rank 3 Hermitian matrix, however. As shown in the subsection entitled "Number of Independent Equations," as many as 15 real parameters are required to specify the elements of [Q].

4. Gaussian Scattering Interpretation

The expectation matrix elements can be evaluated simply if it is assumed that the scattering coefficients $S_{HH}$, $S_{HV}$, $S_{VH}$ and $S_{VV}$ have a known statistical distribution. A commonly used scattering probability distribution function for scattering problems of this type is a zero-mean multi-variate complex Gaussian distribution. This distribution is generally considered to be valid for single-look radar imagery. This probability distribution function is characterized by three real-valued variances ($\sigma_{HH}^2$, $\sigma_{VV}^2$, and $\sigma_{HV}^2$) and the real-valued correlation coefficient r of $S_{HH}$ and $S_{VV}$. Alternatively, a scattering probability distribution function such as the k-distribution can be used.

The assumptions used in the Gaussian scattering interpretation include:
1. The real/imaginary parts of each scattering matrix element (e.g., $\text{Re}(S_{HH})$ and $\text{Im}(S_{VV})$)) have the same variance and the real/imaginary parts are uncorrelated.
2. The correlation coefficient between the real parts of any two variables is the same as that between the imaginary parts (e.g., $<\text{Re}(S_{HH})\text{Re}(S_{VV}^*)> = <\text{Im}(S_{HH})\text{Im}(S_{VV}^*)>$).

3. The mean scattering process is reciprocal (i.e., $<S_{HV}S_{HV}^*> = <S_{VH}S_{VH}^*> = <S_{HV}S_{VH}^*>$; note that this is a less restrictive assumption than $S_{HV}=S_{VH}$).

4. Expectation values of the cross-polarization terms are identically zero (i.e., $<S_{HH}S_{HV}^*> = <S_{HH}S_{VH}^*> = <S_{VV}S_{HV}^*> = <S_{VV}S_{HV}^*> = 0$). These terms are assumed to be zero based on the considerations discussed in the previously cited papers by Freeman et al. and Klein.

With the Gaussian assumption, [Y] is a real symmetric matrix. The unique elements of this matrix are $Y_{11} = \sigma_{HH}^2 \cos^4\Omega + \sigma_{vv}^2 \sin^4\Omega - 2r\sigma_{HH}\sigma_{VV}\sin^2\Omega\cos^2\Omega$ $Y_{12} = (\sigma_{HH}^2 + r\sigma_{HH}\sigma_{VV})\sin\Omega\cos^3\Omega - (r\sigma_{HH}\sigma_{VV} + \sigma_{vv}^2)\sin^3\Omega\cos\Omega$ $Y_{13} = -(\sigma_{HH}^2 + r\sigma_{HH}\sigma_{VV})\sin\Omega\cos^3\Omega + (r\sigma_{HH}\sigma_{VV} + \sigma_{VV}^2)\sin^3\Omega\cos\Omega$ $Y_{14} = r\sigma_{HH}\sigma_{VV} - (\sigma_{HH}^2 + \sigma_{VV}^2 + 2r\sigma_{HH}\sigma_{VV})\sin^2\Omega\cos^2\Omega$ $Y_{22} = \sigma_{HV}^2 + (\sigma_{HH}^2 + \sigma_{VV}^2 + 2r\sigma_{HH}\sigma_{VV})\sin^2\Omega\cos^2\Omega$ $Y_{23} = \sigma_{HV}^2 - (\sigma_{HH}^2 + \sigma_{VV}^2 + 2r\sigma_{HH}\sigma_{VV})\sin^2\Omega\cos^2\Omega$ $Y_{24} = -(\sigma_{HH}^2 + r\sigma_{HH}\sigma_{VV})\sin^3\Omega\cos\Omega + (r\sigma_{HH}\sigma_{VV} + \sigma_{VV}^2)\sin^2\Omega\cos^3\Omega$ $Y_{33} = \sigma_{HV}^2 + (\sigma_{HH}^2 + \sigma_{VV}^2 + 2r\sigma_{HH}\sigma_{VV})\sin^2\Omega\cos^2\Omega$ $Y_{34} = (\sigma_{HH}^2 + r\sigma_{HH}\sigma_{VV})\sin^3\Omega\cos\Omega - (r\sigma_{HH}\sigma_{VV} + \sigma_{VV}^2)\sin\Omega\cos^3\Omega$ $Y_{44} = \sigma_{HH}^2\sin^4\Omega + \sigma_{VV}^2\cos^4\Omega - 2r\sigma_{HH}\sigma_{VV}\sin^2\Omega\cos^2\Omega$ (22)

Expressions for the $[\Gamma^{mn}]$ matrix elements can be formed directly from these terms.

5. Solution for Calibration Coefficients

The values of the polarimetric calibration coefficients or variables can be solved for directly from the [Q] matrix entries (Equation 14 or 20). As shown in the Number of Independent Equations subsection below, there are 15 independent real equations that can be derived from the 16 complex [Q] matrix terms since [Q] is rank 3 Hermitian. The equation set thus provides for solution of 15 unknown parameters. In the most general case, the unknowns include 6 complex calibration coefficients, 4 real scaled scattering expectation terms ($A\sigma_{HH}$, $A\sigma_{VV}$, $A\sigma_{HV}$, and r), and the real-valued Faraday rotation angle, for a total of 17 unknowns. If A is known from other means, the non-scaled (equivalently, absolute) values $\sigma_{HH}$, $\sigma_{VV}$, $\sigma_{HV}$, and r can be solved for instead, although the exact values of these quantities are generally not of interest.

At least one additional assumption or constraint must be made to increase the number of equations from 15 to either 16 (in the case where the Faraday rotation angle is known) or 17 (in the case where the Faraday rotation angle is among the knowns). Possibilities for these constraints were discussed with regard to step 244 of FIG. 2.

Thus, by applying one or more of these constraints to create one or more additional equations, the number of equations can be increased appropriately, such that 16 or 17 unknowns can be solved for depending on whether the Faraday rotation angle is known. Further, note that the solution of such a non-linear equation set can be performed using well known numerical techniques. In particular, a solution can be obtained using a Newton-Raphson approach as discussed in the Simulation subsection below.

Full radiometric calibration can be performed based on the determined values of the calibration coefficients if A is known by some other means. It should be noted that A is a non-polarimetric quantity and thus can be calibrated using ground-based calibrators which are less sensitive to angular orientation than polarimetric ground-based calibrations. For example, A can be determined easily by calculating the total power returned from a trihedral reflector or spherical reflector without regard to the particular values of the H and V components. Alternatively, regions of the image with known reflectivity can be used to determine A. In any case, the amplitude A is expected to be relatively stable over time as compared with calibration of quantities which include temperature sensitive phase terms such as the calibration coefficients. It should thus be possible using this technique to achieve full radiometric and polarimetric calibration with reference to considerably fewer artificial ground-based calibrators than is required by other techniques.

6. Implementation

Referring again to the selection of the entries of [Q], the 16 entries of the expectation matrix [Q] are obtained by summing the corresponding matrix elements of [Z] for each pixel over the pixel sampling and normalizing (typically division by the number of pixels within the sampling sub-image). From the 16 entries, the 15 terms representing independent information in the matrix are identified. An effective choice is;

| | | | (23) |
|---|---|---|---|
| (1) $ReQ_{11}$ | (6) $ReQ_{14}$ | (11) $ReQ_{24}$ | |
| (2) $ReQ_{12}$ | (7) $ImQ_{14}$ | (12) $ImQ_{24}$ | |
| (3) $ImQ_{12}$ | (8) $ReQ_{22}$ | (13) $ReQ_{33}$ | |
| (4) $ReQ_{13}$ | (9) $ReQ_{23}$ | (14) $ReQ_{34}$ | |
| (5) $ImQ_{13}$ | (10) $ImQ_{23}$ | (15) $ImQ_{34}$ | | where "Re" denotes the real portion of an entry and "Im" denotes the imaginary portion of an entry.

These measured values of [Q] are set equal to their corresponding theoretical expansion written as functions of the calibration variables and statistical parameters of the scattering variables, $S_{ij}$. Several sets of these theoretical equations may be available for the polarimetric radar signal analysis process corresponding to (2) particular choices of the scattering probability distribution function, and/or (2) particular assumptions or constraints used to increase the number of equations to 16 or 17 as needed. The choice of a particular equation set is based on knowledge of the radar system apparatus and the expected distribution of the scattering random variables within the sampling. If necessary (and as represented above), the accuracy of the equations can be improved by subtracting an estimated noise power, $n_i^2$, $1 \leq i \leq 4$, from each of the on-diagonal elements of [Q]. Noise power estimate for this purpose can be obtained through internal calibration, measurement of "free-space" radar returns, or measurement of low cross-section scattering surfaces (i.e., measurements of scattered signals from regions where the received scattering is below the noise power).

With the theoretical equations set equal to their corresponding measured values, the equation set is solved using an appropriate simultaneous equation solving technique. A standard numerical technique such as Newton-Raphson provides a good approach. However, any of the many accepted numerical approaches may be used.

The solutions for the calibration coefficients are then entered into the polarimetric calibration matrix $[P]=[D]^{-1}$ where $[D]$ is given by the matrix and equations at (21). The matrix $[P]$ represents the output of the polarimetric calibration processor 354. For data in scattering matrix format, this matrix is multiplied by $[\bar{V}]$ on a pixel-by-pixel basis to obtain a relative polarimetric calibrated image. Further, note that matrix multiplications based on $[P]$ can be used to also calibrate data in Stokes or other formats as well. If the absolute amplitude factor A is known, division of each pixel value by A produces an absolute radiometric/polarimetric calibrated image.

7. Simulation

To evaluate the performance of this process, the equation set based on a Gaussian distribution was solved using a Newton-Raphson routine. Performance under realistic conditions was simulated by determining the exact value of $Q_{ij}$ for a particular choice of the 12 calibration coefficients, 4 scattering parameters, and the Faraday rotation angle. Receiver noise was then added (as indicated in Equation 14) and a random Gaussian term with standard deviation $\sigma = \Delta Q_{ij}$ was included to simulate the effect of population sampling. Assuming a uniformly textured image over which the calibration is to be performed, the value $\Delta$ corresponds directly to the number of pixels $N_p$ used in the calibration image through the relation $\Delta = \sqrt{N_p}^{-1}$. Using these modified values of $Q_{ij}$, the original parameters were then solved for using the Newton-Raphson routine and the deviation of the solved parameters from the true values was determined. To provide an additional constraint for obtaining a solution for 17 unknowns, one of the complex cross-talk coefficients was assumed to be known by other means and was not solved for.

Using appropriate initial guesses for the parameters, as required by the Newton-Raphson method, the simulation was found to converge to the correct values of the remaining 15 unknowns to a high degree of precision. This simulation demonstrates the validity of the calibration technique.

8. Discussion

A. Faraday Rotation Variability

It is assumed in this derivation that the Faraday rotation angle is substantially constant over the scene being imaged. Faraday rotation is a rotation of the plane of polarization for a linearly polarized signal that occurs as the signal propagates through the ionosphere 130. For wave frequencies much larger than the plasma frequency (a condition generally satisfied for frequencies greater than 100 MHz), the magnitude of the rotation is given by $$\Omega = K_F f^{-2} \int_{path} B_{||} N_e ds \tag{24}$$

where $\Omega$ is the rotation angle in radians, f is the wave frequency in Hz, $B_2$ is the magnetic field component in Gauss along the propagation direction, $N_c$ is the electron density in cm$^{-3}$, s is the path length in cm, and $K_F = 2.36 \cdot 10^4$ G$^{-1}$cm$^2$s$^{-2}$. It is common to remove the magnetic field term from the integral by assuming a weighted mean value for $B_1$ over the path giving $$\Omega = K_F f^{-2} \overline{B_{||}} \int_{path} N_e ds \tag{25}$$

The integral now corresponds to the cumulative electron density along the raypath, known as the Total Electron Content (TEC).

A typical spaceborne SAR image is formed as the spacecraft moves a distance of 7–70 km in a time of 1–10 sec. Spatial variations in $\Omega$ result from variations in both $B_{||}$ and TEC as the line-of-sight through the ionosphere changes. Temporal variations in $\Omega$ are caused by temporal fluctuations in TEC during the receiving of the scattered polarimetric signal. A moving spaceborne platform cannot in general distinguish between temporal and spatial variations. All variations are instead interpreted as spatial variations by the polarimetric radar signal processing system of the present invention.

The magnitude of the maximum Faraday variation $\Delta\Omega_m$ due to spatial variation in $B_{81}$ over this distance is given to first order by $$\frac{\Delta\Omega_m}{\Omega} \simeq -\Delta\phi_m \tan\phi_0 \tag{26}$$

where $\phi$ is the nominal angle between the line-of-sight and the magnetic field direction, $\phi_0$ is the mean value of $\phi$, and $\Delta\phi_m$ is the maximum value of $\phi - \phi_0$. Approximate values of $\Delta\phi_m$ for a typical spacecraft altitude of 700 km are in the range of $5.0*10^{-3}$ to $5.0*10^{-2}$ for imaging distances of 7–70 km.

The magnitudes of spatial and temporal variations in TEC are somewhat more difficult to quantify, since they depend on a large number of parameters such as latitude, longitude, solar illumination angle, and solar activity level. Recent work at mid-latitudes, where the majority of radar imaging is performed, has shown typical random temporal and spatial TEC variations to be less than 0.3% of the TEC value. Worst case gradients were found to be less than 0.2 TECU/km (1 TECU equals $10^{16}$ el/m$^2$) or 0.2%/km for a typical TEC value of 10 TECU. Highly variable TEC values are generally found only at high latitudes and during evening hours near the geomagnetic equator.

The impact of $\Omega$ variations can be accounted for by relaxing the assumption that $\Omega$ is constant over the image and describing $\Omega$ as a random variable. The entire $\Omega$ dependence is contained in $[Y]$, so only the $[Y]$ entries need to be adjusted to account for $\Omega$ variations in the spatial averaging process. Defining $\Omega = \Omega_0 + \Delta\Omega$ and keeping terms to first order in the Taylor expansion, $$\sin\Omega \simeq \sin\Omega_0 + \Delta\Omega \cos\Omega hd\ 0$$

$$\cos\Omega \simeq \cos\Omega_0 - \Delta\Omega \sin\Omega_0 \tag{27}$$

where $\Omega_0$ is the mean value of $\Omega$ within the image. The relevant terms in the [Y] entries become $$<\cos^4\Omega> \simeq \cos^4\Omega_0 + 6<\Delta\Omega^2>\cos^2\Omega_0\sin^2\Omega_0 + <\Delta\Omega^4>\sin^4\Omega_0$$

$$<\sin^4\Omega> \simeq \sin^4\Omega_0 + 6<\Delta\Omega^2>\cos^2\Omega_0\sin^2\Omega_0 + <\Delta\Omega^4>\cos^4\Omega_0$$

$$<\sin^2\Omega\cos^2\Omega> \simeq \sin^2\Omega_0\cos^2\Omega_0 + <\Delta\Omega^2>\sin^4\Omega_0 - 4<\Delta\Omega^2>\sin^2\Omega_0\cos^2\Omega_0 + <\Delta\Omega^2>\cos^4\Omega_0$$

$$<\sin\Omega\cos^3\Omega> \simeq \sin\Omega_0\cos^3\Omega_0 - 3<\Delta\Omega^2>\sin^3\Omega_0\cos\Omega_0 + 3<\Delta\Omega^2>\sin\Omega_0\cos^3\Omega_0$$

$$<\sin^3\Omega\cos\Omega> \simeq \sin^3\Omega_0\cos\Omega_0 + 3<\Delta\Omega^2>\sin\Omega_0\cos^3\Omega_0 + 3<\Delta\Omega^2>\sin^3\Omega_0\cos\Omega_0 \quad (28)$$

The contribution of $\Omega$ variations to the expectation matrix entries are thus first order in $<\Delta\Omega^2>$. In most cases of interest, the $\Omega$ variations can be ignored and the calibration problem can be reliably solved to obtain an estimate of $\Omega_0$. The acceptable level of error in the expectation terms depends on the level of measurement noise that can be tolerated by the particular equation solution method.

B. Sampling Selection Criteria

The sampling selected for determining the polarimetric calibration parameters (i.e., entries of the matrix [P]) must satisfy two basic criteria: (1) the set of pixels within the sampling (or, equivalently, subregions of region 110) have a statistical distribution approximating the ensemble statistics of an individual pixel or subregion, and (2) any variation in the signal calibration coefficients within the sampling is small. The pixels within the sampling do not need to be contiguous, allowing editing of anomalous regions, such as ponds, thereby allowing better approximation to a homogeneous probability scatter distribution function. The previously cited references to Freeman et al. and Klein provide detailed discussions of the requirements placed on sample selection including the need for an azimuthally symmetric scattering surface. Unlike these approaches, however, the technique disclosed in the present invention replaces the pixel reciprocity requirement ($S_{HV}=S_{VH}$) with the less restrictive ensemble reciprocity requirement ($<S_{HV}S_{HV}^*> = <S_{VH}S_{VH}^*> = <S_{HV}S_{VH}^*>$). For at least one synthetic aperture radar (SAR) system, the above two criteria imply selection of a sampling having a rectangular shape with minimal vertical extent in homogeneous scatterer regions such as fields or forest. Further, it has been shown that good results can be obtained for vegetation, ocean, and geological surfaces. In polarimetric radar signal processing systems for which the calibration coefficients vary with range, multiple samplings can be selected to determine coefficient values as a function of vertical orientation. The size of the samplings depends on the level of measurement noise that can be tolerated by the equation solution method. Assuming a uniformly textured image over which the calibration is to be performed, the error in the measured [Q] elements has a Gaussian distribution with standard deviation $\sigma = \Delta Q_{ij}$ where $\Delta$ corresponds to the number of pixels $N_p$ used in the * sampling through the relation $\Delta = \sqrt{N_p^{-1}}$.

9. Number of Independent Equations

The analysis described in this paper is based on the assertion that [Q], a $4\times 4$ rank 3 Hermitian matrix, required up to 15 real parameters to fully specify the matrix entries. Stated differently, the elements of this matrix contain as many as 15 unique pieces of information that can be used to determine the values of up to 15 real parameters.

Consider the measurement matrix $$[\tilde{V}] = (V_{11} V_{12} V_{21} V_{22})^T \quad (29)$$

The entries in this matrix can be determined by performing the matrix multiplications specified in Equation 1, giving $$\tilde{V}_1 = (1+\alpha\delta_2)\tilde{X}_1 + (\delta_4+\delta_2)\tilde{X}_2 + {}^*(\delta_2\delta_4+\alpha\delta_2)\tilde{X}_4$$

$$\tilde{V}_2 = (\delta_3+\alpha\delta_2\delta_3)\tilde{X}_1 + (F_T+\delta_2\delta_3)\tilde{X}_2 + (\delta_2 F_T+\alpha\delta_2\delta_3)\tilde{X}_4$$

$$\tilde{V}_3 = (\delta_1+\alpha F_R)\tilde{X}_1 + (\delta_1\delta_4+F_R)\tilde{X}_2 + (\delta_4 F_R+\alpha F_R)\tilde{X}_4$$

$$\tilde{V}_4 = (\delta_1\delta_3+\alpha\delta_3 F_R)\tilde{X}_1 + (\delta_1 F_T+\delta_3 F_R)\tilde{X}_2 + (F_R F_T+\alpha\delta_3 F_R)\tilde{X}_4 \quad (30)$$

where $\tilde{X}_3$ has been written as a linear combination of $\tilde{X}_1$, $\tilde{X}_2$, and $\tilde{X}_4$ in the form $$\tilde{X}_3 = \alpha\tilde{X}_1 + \tilde{X}_2 + \alpha\tilde{X}_4 \quad (31)$$

with $$\alpha = \frac{2\sin\Omega\cos\Omega}{\sin^2\Omega - \cos^2\Omega} \quad (32)$$

Note that when $\Omega=0$, this reduces to $\tilde{X}_3 = \tilde{X}_2$ as expected.

Writing $$\tilde{V}_3 = b_1\tilde{V}_1 + b_2\tilde{V}_2 + b_4\tilde{V}_4 \quad (33)$$

the coefficients of each $\tilde{X}_i$ in Equation 30 can be related using Equation 33, since $\tilde{X}_1$, $\tilde{X}_2$, and $\tilde{X}_4$ are linearly independent, giving a matrix equation for the coefficients $b_i$ given by $$\begin{pmatrix} 1+\alpha\delta_2 & \delta_3+\alpha\delta_2\delta_3 & \delta_1\delta_3+\alpha\delta_3 F_R \\ \delta_4+\delta_2 & F_T+\delta_2\delta_3 & \delta_1 F_T+\delta_3 F_R \\ \delta_2\delta_4+\alpha\delta_2 & \delta_2 F_T+\alpha\delta_2\delta_3 & F_R F_T+\alpha\delta_3 F_R \end{pmatrix} \begin{pmatrix} b_1 \\ b_2 \\ b_4 \end{pmatrix} = \begin{pmatrix} \delta_1+\alpha F_R \\ \delta_1\delta_4+F_R \\ \delta_4 F_R+\alpha F_R \end{pmatrix} \quad (34)$$

The three coefficients $b_i$ can be determined independently if the determinant of the above matrix is rank 3, which is easily shown by multiplying out the terms.

The unique entries of [Q] can be written as $$Q_{11} = <\tilde{V}_1\tilde{V}_1^*>$$

$$Q_{12} = <\tilde{V}_1\tilde{V}_2^*>$$

$$Q_{13} = <\tilde{V}_1(v_1^*\tilde{V}_1^* + b_2^*\tilde{V}_2^* + b_4^*\tilde{V}_4^*)> = b_1^* Q_{11} + b_2^* Q_{12} + b_4^* Q_{14}$$

$$Q_{14} = <\tilde{V}_1\tilde{V}_4^*>$$

$$Q_{22} = <\tilde{V}_2\tilde{V}_2^*>$$

$$Q_{23} = <\tilde{V}_2(b_1^*\tilde{V}_1^* + b_2^*\tilde{V}_2^* + b_4^*\tilde{V}_4^*)> = b_1^*Q_{12} + b_2^*Q_{22} + b_4^*Q_{24}$$

$$Q_{24} = <\tilde{V}_2\tilde{V}_4^*>$$

$$Q_{33} = <(b_1\tilde{V}_1 + b_2\tilde{V}_2 + b_4\tilde{V}_4)(b_1^*\tilde{V}_1^* + b_2^*\tilde{V}_2^* + b_4^*\tilde{V}_4^*)>$$
$$= |b_1|^2Q_{11} + 2Re(b_1b_2Q_{12}) + 2Re(b_1b_4Q_{14}) + |b_2|^2Q_{22} + 2Re(b_2b_4Q_{24}) + |b_4|^2Q_{44}$$

$$Q_{34} = <(b_1\tilde{V}_1 + b_2\tilde{V}_2 + b_4\tilde{V}_4)\tilde{V}_4^*> = b_1Q_{14} + b_2Q_{24} + b_4Q_{44}$$

$$Q_{44} = <\tilde{V}_4\tilde{V}_4^*> \quad (35)$$

[Q] thus requires at most 9 independent complex parameters to specify all of the matrix entries. As shown in Equation 35, these 9 parameters are $Q_{11}$, $Q_{12}$, $Q_{14}$, $Q_{22}$, $Q_{24}$, $Q_{44}$, $b_1$, $b_2$, and $b_4$. Since $Q_{11}$, $Q_{22}$, and $Q_{44}$ are real under all conditions, the real and complex parts of the 9 terms can be fully specified with at most 15 real parameters. Alternately, $Q_{11}$, $Q_{12}$, $Q_{13}$, $Q_{14}$, $Q_{22}$, $Q_{23}$, $Q_{24}$, $Q_{33}$, and $Q_{34}$ can be used as an equivalent set of parameters since knowledge of $Q_{13}$, $Q_{23}$, $Q_{33}$, and $Q_{34}$ directly determines $Q_{44}$, $b_1$, $b_2$, and $b_4$.

In certain situations, the number of parameters required to fully define [Q] may be less than 15. This occurs if any of the 9 complex parameters is solely a function of the other 8 parameters, for example $$Q_{13} = G(Q_{11}, Q_{12}, Q_{14}, Q_{22}, Q_{23}, Q_{24}, Q_{33}, Q_{34}) \quad (36)$$

where G is an undetermined function. Since the $g_k$ terms are independently specified in Equation 14, however, any such function must hold identically for all possible values of $g_k$ for a given k. The coefficient of $g_1$ in $Q_{13}$ in Equation 36, for example, must identically match the combined coefficient of $g_1$ determined by the function G. Writing only the first three terms of each $Q_{ij}$ from Equation 14, $$Q_{11} = Y_{11}$$

$$Q_{12} = F_T^* Y_{12}$$

$$Q_{13} = F_R^*(Y_{13} + g_1^* Y_{11})$$

$$Q_{14} = F_T^* F_R^*(Y_{14} + g_1^* Y_{12})$$

$$Q_{22} = |F_T| Y_{22}$$

$$Q_{23} = F_T F_R^*(Y_{23} + g_1^* Y_{12})$$

$$Q_{24} = |F_T|^2 F_R^*(Y_{24} + g_1^* Y_{22})$$

$$Q_{33} = |F_R|^2(Y_{33} + g_1^* Y_{13} + g_1 Y_{13})$$

$$Q_{34} = |F_R|^2 F_T^*(Y_{34} + g_1^* Y_{23} + g_1 Y_{14}) \quad (37)$$

it is clear that there is in general (for all values of the $\delta$ and F parameters) no function that matches $g_1$ identically. This implies that there is no function that maps any 8 of the $Q_{ij}$ to the ninth $Q_{ij}$ identically. It is thus concluded that up to 15 independent real equations can be derived from the entries of [Q] and these equations can be used to solve for up to 15 unknown parameters.

Potential radar applications where this process is of use include calibration of SAR images from instruments such as SIR-C and the JPL AirSAR, development of spaceborne SAR instruments at P-band and other frequencies previously considered impossible to work at due to Faraday rotation effects, high spatial resolution determination of Faraday rotation and ionospheric total electron content, ionospheric tomography, and geological surface/sub-surface mapping. Moreover, this process is valid for both monostatic and bistatic radar systems.

While the apparatus and method disclosed here is in terms of the radar imaging problems, it is in fact valid for any polarimetric wave scattering problem which can be formulated in terms of a signal scattering equation of the form shown in Equation 2 where [R] and [T] are arbitrary signal distortion matrices.

The foregoing discussion of the invention has been presented for purposes of illustration and description. Further, the description is not intended to limit the invention to the form disclosed herein. Consequently, variation and modification commensurate with the above teachings, within the skill and knowledge of the relevant art, are within the scope of the present invention. The embodiment described hereinabove is further intended to explain the best mode presently known of practicing the invention and to enable others skilled in the art to utilize the invention as such, or other embodiments, and with the various modifications required by their particular application or uses of the invention. It is intended that the appended claims be construed to include alternative embodiments to the extent permitted by the prior art.

What is claimed is:

1. A process for obtaining information regarding a region of interest comprising the steps of:
    transmitting a first polarized polarimetric signal toward a first region using a first channel transmission means;
    receiving a first scattering signal of the first polarized polarimetric signal scattered from within a plurality of subregions of the first region, for each subregion, the first scattering signal having a first polarimetric signal portion, $B_1$, received by a first channel receiving means, and having a second polarimetric signal portion, $B_2$, received by a second channel receiving means;
    transmitting a second polarized polarimetric signal, distinct from said first polarized polarimetric signal, toward the first region using a second channel transmission means;
    receiving a second scattering signal of the second polarized polarimetric signal scattered from each of the plurality of subregions, for each subregion, the second scattering signal having a third polarimetric signal portion, $B_3$, received by a third channel receiving means, and having a fourth polarimetric signal portion, $B_4$, received by a fourth channel receiving means;
    generating a plurality of pixels, each said pixel including data corresponding to a subregion of said plurality of subregions, each said pixel generated using data corresponding with at least one collection of said signal portions $B_i$, $1 \leq i \leq 4$, where each $B_i$ includes signals scattered from the subregion corresponding to the pixel;

selecting a sample collection of the plurality of pixels;

determining statistical expectation values representing entries of a predetermined expectation matrix using the data of at least one pixel from said sample collection;

obtaining values for one or more signal calibration variables by solving substantially simultaneously a first plurality of real valued equations for the values of a plurality of real unknowns corresponding to the real and imaginary portions of said plurality of signal calibration variables, said first plurality of real valued equations including a plurality of expectation equations, each expectation equation obtained by equating one of said expectation values, determined in said step of determining, to a theoretical expansion of the corresponding entry in the predetermined expectation matrix, said calibration variables relating to:

(1) corresponding zero or more channel imbalances between:

(a) said first channel transmission means and said second channel transmission means when transmitting said first polarized polarimetric signal and said second polarized polarimetric signal;

(b) said first channel receiving means and said second channel receiving means when receiving said first scattering signal;

(c) said third channel receiving means and said fourth channel receiving means when receiving said second scattering signal; and (2) corresponding zero or more cross-talk polarimetric signal distortions between:

(d) said first channel receiving means and said second channel receiving means when receiving the first scattering signal;

(e) said third channel receiving means and said fourth channel receiving means when receiving the second scattering signal;

(f) said first channel transmission means and said second channel transmission means when transmitting the first polarized polarimetric signal;

(g) said first channel transmission means and said second channel transmission means when transmitting the second polarized polarimetric signal; and (3) corresponding to a Faraday rotation angle;

calibrating one or more pixels using the values for said plurality of the signal calibration variables obtained in said step of obtaining;

using the calibrated pixels to obtain information regarding the region.

2. A method, as claimed in claim 1, wherein the data for each pixel includes values in one of the formats: scattering matrix format, Stokes matrix format, and cross-product matrix format.

3. A method, as claimed in claim 1, wherein a predetermined probability distribution function for said predetermined expectation matrix is a probability distribution function for the following scattering random variables:

$S_{HH}$, a scattering random variable related to the signal portion $B_1$ from substantially each subregion of the plurality of subregions;

$S_{VH}$, a scattering random variable related to the signal portion $B_2$ from substantially each subregion of the plurality of subregions;

$S_{HV}$, a scattering random variable related to the signal portion $B_3$ from substantially each subregion of the plurality of subregions;

$S_{VV}$, a scattering random variable related to the signal portion $B_4$ from substantially each subregion of the plurality of subregions.

4. A method, as claimed in claim 3, wherein said predetermined probability distribution function is a zero-mean complex multi-variate Gaussian distribution function.

5. A method, as claimed in claim 3, wherein said predetermined probability distribution function is a k-distribution.

6. A method, as claimed in claim 3, wherein the plurality of signal calibration variables include:

$F_R$, a complex channel imbalance variable whose value represents at least one of (b) and (c) of claim 1;

$F_T$, a complex channel imbalance variable whose value represents (a) of claim 1;

$\delta_1$, a first complex cross-talk variable whose value represents at least one of the cross-polarization and channel interference of (d) of claim 1;

$\delta_2$, a second complex cross-talk variable whose value represents at least one of the cross-polarization and channel interference of (e) of claim 1;

$\delta_3$, a third complex cross-talk variable whose value represents at least one of the cross-polarization and channel interference of (f) of claim 1;

$\delta_4$, a fourth complex cross-talk variable whose value represents at least one of the cross-polarization and channel interference of (g) of claim 1.

7. A method, as claimed in claim 6, wherein each said theoretical expansion determined for an entry in the predetermined expectation matrix is an expansion of an entry in the following representation of the expectation matrix:

$$A^{2} \cdot ([D][Y][D]^\dagger) + [Q_n],$$

where

A is a real amplitude of said received signals, $B_1$, $B_2$, $B_3$, and $B_4$, $$[D] = \begin{pmatrix} u_1 v_1 & u_3 v_1 & u_1 v_2 & u_3 v_2 \\ u_2 v_1 & u_4 v_1 & u_2 v_2 & u_4 v_2 \\ u_1 v_3 & u_3 v_3 & u_1 v_4 & u_3 v_4 \\ u_2 v_3 & u_4 v_3 & u_2 v_4 & u_4 v_4 \end{pmatrix}$$

and, $u_1 = \cos\Omega + \delta_4\sin\Omega \qquad v_1 = \cos\Omega - \delta_2\sin\Omega$ $u_2 = \delta_3\cos\Omega + F_T\sin\Omega \qquad v_2 = \sin\Omega + \delta_2\cos\Omega$ $u_3 = -\sin\Omega + \delta_4\cos\Omega \qquad v_3 = \delta_1\cos\Omega - F_R\sin\Omega$ $u_4 = -\delta_3\sin\Omega + F_T\cos\Omega \qquad v_4 = \delta_1\sin\Omega + F_R\cos\Omega$ $[D]^\dagger$ denotes the complex conjugate transpose of $[D]$, and $[Y]$ is a $4 \times 4$ matrix, each entry being an expectation expansion, according to the predetermined probability distribution function of said scattering random variables, of a corresponding entry of the $4 \times 4$ matrix: $[\tilde{X}][\tilde{X}]^\dagger$, $[\tilde{X}]^\dagger$ denotes the complex conjugate transpose of $[\tilde{X}]$, and $$[X] = \begin{pmatrix} X_{11} & X_{21} \\ X_{12} & X_{22} \end{pmatrix}$$

where $X_{11} = S_{HH}\cos^2\Omega - S_{VV}\sin^2\Omega + (S_{HV} - S_{VH})\sin\Omega\cos\Omega$ $X_{12} = S_{VH}\cos^2\Omega + S_{HV}\sin^2\Omega + (S_{HH} + S_{VV})\sin\Omega\cos\Omega$ $X_{21} = S_{HV}\cos^2\Omega + S_{VH}\sin^2\Omega - (S_{HH} + S_{VV})\sin\Omega\cos\Omega$ $X_{22} = -S_{HH}\sin^2\Omega + S_{VV}\cos^2\Omega + (S_{HV} - S_{VH})\sin\Omega\cos\Omega$ where $$[\tilde{X}] = \begin{bmatrix} \tilde{X}_1 \\ \tilde{X}_2 \\ \tilde{X}_3 \\ \tilde{X}_4 \end{bmatrix} \text{ and}$$

where $\Omega$ is a Faraday rotation angle and $[Q_n]$ is a receiver noise power $4 \times 4$ diagonal matrix.

8. A method, as claimed in claim 1, wherein the Faraday rotation angle is substantially zero when substantially no portion of an ionosphere exists between the region and one of: the first channel transmission means, the second channel transmission means, the first channel receiving means, the second channel receiving means, the third channel receiving means, the fourth channel receiving means.

9. A method as claimed in claim 1, wherein said step of calibrating includes determining the entries of the following calibration matrix:

$$[P] = [D]^{-1} \text{ where } [D] = \begin{pmatrix} u_1v_1 & u_3v_1 & u_1v_2 & u_3v_2 \\ u_2v_1 & u_4v_1 & u_2v_2 & u_4v_2 \\ u_1v_3 & u_3v_3 & u_1v_4 & u_3v_4 \\ u_2v_3 & u_4v_3 & u_2v_4 & u_4v_4 \end{pmatrix}$$

$u_1 = \cos\Omega + \delta_4\sin\Omega \qquad v_1 = \cos\Omega - \delta_2\sin\Omega$ $u_2 = \delta_3\cos\Omega + F_T\sin\Omega \qquad v_2 = \sin\Omega + \delta_2\cos\Omega$ $u_3 = -\sin\Omega + \delta_4\cos\Omega \qquad v_3 = \delta_1\cos\Omega - F_R\sin\Omega$ $u_4 = -\delta_3\sin\Omega + F_T\cos\Omega \qquad v_4 = \delta_1\sin\Omega + F_R\cos\Omega$ and one or more of the following variables are included in said plurality of signal calibration variables:

$F_R$ is a complex channel imbalance variable whose value represents a channel imbalance between at least one of (b) and (c) of claim 1;

$F_T$ is a complex channel imbalance variable whose value represents a channel imbalance between (a) of claim 1;

$\delta_1$, is a first complex cross-talk variable whose value represents at least one of the cross-polarization and channel interference of (d) of claim 1;

$\delta_2$, is a second complex cross-talk variable whose value represents at least one of the cross-polarization and channel interference of (e) of claim 1;

$\delta_3$, is a third complex cross-talk variable whose value represents at least one of the cross-polarization and channel interference of (f) of claim 1;

$\delta_4$, is a fourth complex cross-talk variable whose value represents at least one of the cross-polarization and channel interference of (g) of claim 1;

$\Omega$ is a Faraday rotation angle.

10. A method as claimed in claim 9, wherein said step of calibrating includes using said calibration matrix [P] to calibrate at least one pixel corresponding to a subregion of said plurality of subregions.

11. A method, as claimed in claim 10, wherein said calibration matrix [P] is used for obtaining information regarding a second region of interest, said second region substantially distinct from said first region.

12. A method, as claimed in claim 9, wherein said step of calibrating includes at least one matrix multiplication, by the calibration matrix [P], of data for each pixel of said one or more pixels to calibrate.

13. A method, as claimed in claim 1, wherein said step of determining includes obtaining values for at least six of the entries for the predetermined expectation matrix.

14. A method, as claimed in claim 1, wherein the $ij^{th}$ entry of the expectation matrix is a function of the complex product of $\tilde{V}_i$ and $\tilde{V}_j^*$, $1 \leq i \leq 4$ and $1 \leq j \leq 4$, for each pixel in said sample collection, said pixel including data in the scattering matrix format: $[\tilde{V}] = (\tilde{V}_1, \tilde{V}_2, \tilde{V}_3, \tilde{V}_4)^T$, where $\tilde{V}_j^*$ is the complex conjugate of $\tilde{V}_j$.

15. A method, as claimed in claim 1, wherein the $ij^{th}$ entry of the expectation matrix is in Stokes format.

16. A method, as claimed in claim 1, wherein said plurality of expectation equations includes an expectation equation of the following entries of the expectation matrix: the (1,1) entry, the (1,2) entry, the (1,3) entry, the (1,4) entry, the (2,2) entry, the (2,3) entry, the (2,4) entry, the (3,3) entry and the (3,4) entry.

17. A method, as claimed in claim 1, wherein said step of solving includes solving for real values of sixteen unknowns of the plurality of real unknowns whenever a Faraday rotation angle is known, said first plurality of real valued equations including sixteen real valued equations that are solved substantially simultaneously for said sixteen unknowns of the plurality of real unknowns, fifteen real valued equations of said sixteen real valued equations are expectation equations in said plurality of expectation equations.

18. A method, as claimed in claim 1, wherein said step of solving includes solving for real values of seventeen unknowns of the plurality of real unknowns whenever a Faraday rotation angle is unknown, said first plurality of real valued equations including seventeen real valued equations that are solved substantially simultaneously for said seventeen unknowns of the plurality of real unknowns, fifteen real valued equations of said seventeen real valued equations are expectation equations in said plurality of expectation equations.

19. A method, as claimed in claim 1, wherein said plurality of pixels from said step of generating are radiometrically calibrated.

20. A method, as claimed in claim 1, wherein said step of selecting includes choosing one or more subregions having substantially constant off-boresight angle vertical component.

21. A method, as claimed in claim 1, wherein said first polarized polarimetric signal is orthogonal to said second polarized polarimetric signal.

22. A method, as claimed in claim 1, wherein said first polarimetric signal portion is orthogonal to said second polarimetric signal portion.

23. A process for obtaining information regarding an ionosphere comprising the steps of:

transmitting a first polarized polarimetric signal toward a region using a first channel transmission means;

receiving a first scattering signal of the first polarized polarimetric signal scattered from within a plurality of subregions of the region, for each subregion, the first scattering signal having a first polarimetric signal portion, $b_1$, received by a first channel receiving means, and having a second polarimetric signal portion, $b_2$, received by a second channel receiving means;

transmitting a second polarized polarimetric signal, distinct from said first polarized polarimetric signal, toward the region using a second channel transmission means;

receiving a second scattering signal of the second polarized polarimetric signal scattered from each of the plurality of subregions, for each subregion, the second scattering signal having a third polarimetric signal portion, $B_3$, received by a third channel receiving means, and having a fourth polarimetric signal portion, $B_4$, received by a fourth channel receiving means;

generating a plurality of pixels, each said pixel including data corresponding to a subregion of said plurality of subregions, each said pixel generated using data corresponding with at least one collection of said signal portions $B_1$, $1 \leq i \leq 4$, where each $B_i$ includes signals scattered from the subregion corresponding to the pixel;

selecting a sample collection of the plurality of pixels;

determining statistical expectation values representing entries of a predetermined expectation matrix using the data of at least one pixel from said sample collection;

obtaining values for one or more signal calibration variables by solving substantially simultaneously a first plurality of real valued equations for the values of a plurality of real unknowns corresponding to the real and imaginary portions of said plurality of signal calibration variables, said first plurality of real valued equations including a plurality of expectation equations, each expectation equation obtained by equating one of said expectation values, determined in said step of determining, to a theoretical expansion of the corresponding entry in the predetermined expectation matrix, at least one of said signal calibration variables being a Faraday rotation angle, one or more additional said signal calibration variables relating to:

(1) corresponding zero or more channel imbalances between:
   (a) said first channel transmission means and said second channel transmission means when transmitting said first polarized polarimetric signal and said second polarized polarimetric signal;
   (b) said first channel receiving means and said second channel receiving means when receiving said first scattering signal;
   (c) said third channel receiving means and said fourth channel receiving means when receiving said second scattering signal; and (2) corresponding zero or more cross-talk polarimetric signal distortions between:
   (d) said first channel receiving means and said second channel receiving means when receiving the first scattering signal;
   (e) said third channel receiving means and said fourth channel receiving means when receiving the second scattering signal;
   (f) said first channel transmission means and said second channel transmission means when transmitting the first polarized polarimetric signal;
   (g) said first channel transmission means and said second channel transmission means when transmitting the second polarized polarimetric signal;

identifying the Faraday rotation angle value obtained with said region;

using the identification of the Faraday rotation angle value and said region to obtain information regarding the ionosphere.

* * * * *